US010496245B2

(12) United States Patent
Wang et al.

(10) Patent No.: US 10,496,245 B2
(45) Date of Patent: Dec. 3, 2019

(54) METHOD FOR INTERACTIVE RESPONSE AND APPARATUS THEREOF

(71) Applicant: Tencent Technology (Shenzhen) Company Limited, Shenzhen, Guangdong (CN)

(72) Inventors: Jiqun Wang, Guangdong (CN); Xiangjian Weng, Guangdong (CN); Tao Yang, Guangdong (CN); Dili Fu, Guangdong (CN); Xianqing Yan, Guangdong (CN); Yudong Shen, Guangdong (CN); Bo Wang, Guangdong (CN); Gen Luo, Guangdong (CN); Wei Zhou, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 119 days.

(21) Appl. No.: 15/480,938

(22) Filed: Apr. 6, 2017

(65) Prior Publication Data
US 2017/0212647 A1 Jul. 27, 2017

Related U.S. Application Data

(63) Continuation of application No. PCT/CN2015/090506, filed on Sep. 24, 2015.

(30) Foreign Application Priority Data

Oct. 9, 2014 (CN) .......................... 2014 1 0528098
Nov. 18, 2014 (CN) .......................... 2014 1 0657920

(51) Int. Cl.
*H04L 12/28* (2006.01)
*G06F 3/0482* (2013.01)
(Continued)

(52) U.S. Cl.
CPC ............ *G06F 3/0482* (2013.01); *G06F 3/167* (2013.01); *H04L 65/1006* (2013.01);
(Continued)

(58) Field of Classification Search
CPC combination set(s) only.
See application file for complete search history.

(56) References Cited

U.S. PATENT DOCUMENTS 6,757,732 B1 * 6/2004 Sollee .................... H04L 29/06
  375/222
8,073,112 B2 12/2011 Jaiswal et al.
(Continued)

FOREIGN PATENT DOCUMENTS

CN   101001287 A    7/2007
CN   101170727 A    4/2008
(Continued)

OTHER PUBLICATIONS

International Search Report and Written Opinion of the ISA for PCT/CN2015/090506, Haidian District, Beijing, dated Dec. 23, 2015.
(Continued)

*Primary Examiner* — Atique Ahmed
(74) *Attorney, Agent, or Firm* — Harness, Dickey & Pierce, P.L.C.

(57) ABSTRACT

A method for interactive response and an apparatus thereof are provided. The method includes: establishing a connection with a service terminal; receiving display configuration corresponding to a service client on the service terminal; constructing an interactive interface based on the display configuration, and displaying the interactive interface on a user terminal; obtaining an input operation of a user on the interactive interface; generating feedback information based on the acquired input operation; and transmitting the feed-
(Continued)

back information to the service terminal. Establishing the connection with the serving terminal includes: the user terminal transmits a calling request to a network device; after establishing a Session Initiating Protocol (SIP) calling supporting text transmission between the network device and the service terminal, the user terminal receives a calling response message returned by the network device.

16 Claims, 25 Drawing Sheets

(51) Int. Cl.
*H04M 3/493* (2006.01)
*G06F 3/16* (2006.01)
*H04L 29/06* (2006.01)
*H04L 29/08* (2006.01)
*H04M 3/42* (2006.01)

(52) U.S. Cl.
CPC ...... *H04L 65/1033* (2013.01); *H04L 65/1069* (2013.01); *H04L 67/16* (2013.01); *H04L 67/36* (2013.01); *H04M 3/4217* (2013.01); *H04M 3/493* (2013.01)

(56) References Cited

U.S. PATENT DOCUMENTS

| | | | |
|---|---|---|---|
| 2002/0016819 A1* | 2/2002 | Sugimoto | G06F 17/30265 709/203 |
| 2002/0075306 A1* | 6/2002 | Thompson | G06F 3/0481 715/753 |
| 2003/0043976 A1 | 3/2003 | Arunachalam | |
| 2004/0208301 A1* | 10/2004 | Urban | H04L 47/10 379/142.17 |
| 2006/0184610 A1* | 8/2006 | Izdepski | H04L 67/02 709/203 |
| 2008/0232559 A1 | 9/2008 | Meng et al. | |
| 2008/0267169 A1* | 10/2008 | Mundra | H04L 43/50 370/352 |
| 2013/0031192 A1* | 1/2013 | Caspi | H04L 65/1069 709/206 |
| 2014/0128113 A1* | 5/2014 | Zisimopoulos | H04W 4/70 455/466 |
| 2015/0023484 A1* | 1/2015 | Ni | H04M 3/5166 379/88.18 |
| 2016/0261652 A1* | 9/2016 | Lee | H04M 3/493 |

FOREIGN PATENT DOCUMENTS

| | | |
|---|---|---|
| CN | 101227487 A | 7/2008 |
| CN | 101640736 A | 2/2010 |
| CN | 101742001 A | 6/2010 |
| CN | 102185982 A | 9/2011 |
| CN | 102413418 A | 4/2012 |
| CN | 102663862 A | 9/2012 |

OTHER PUBLICATIONS

First Chinese Office Action regarding Application No. 201410657920.0 dated Dec. 3, 2018. English translation provided by Unitalen Attorneys at Law.
Second Chinese Office Action regarding Application No. 20140528098.8 dated May 20, 2019. English translation provided by Unitalen Attorneys at Law.
First Chinese Office Action regarding Application No. 201410528098.8 dated Oct. 26, 2018. English translation provided by Unitalen Attorneys at Law.

* cited by examiner

METHOD FOR INTERACTIVE RESPONSE AND APPARATUS THEREOF

CROSS REFERENCE TO RELATED APPLICATION

The present application is a continuation of International Application No. PCT/CN2015/090506, filed on Sep. 24, 2015, titled "METHOD AND APPARATUS FOR INTERACTIVE RESPONSE", which claims the priority to Chinese Patent Application No. 201410657920.0, filed on Nov. 18, 2014 with the State Intellectual Property Office of the People's Republic of China, and Chinese Patent Application No. 201410528098.8, filed on Oct. 9, 2014 with the State Intellectual Property Office of the People's Republic of China, which are hereby incorporated by reference in their entireties.

TECHNICAL FIELD

The present disclosure relates to the field of communications, and in particular to a method for interactive response and an apparatus thereof.

BACKGROUND

Interactive voice response (IVR) is a value-added service of wireless voice service and is widely applied to various industries such as bank, aviation, transport company, insurance company, medical institution, securities company, government agency and higher education. In the IVR technology, a user may enter a server center via key or voice selection, access various enterprise databases within a permitted scope and obtain various servers such as voice command for song request, voice chat for making friends, mobile phone magazine, electronic greeting card and customer server center. IVR can enable the user to access information services at any time and any place, and enable enterprises to not only improve their service quality but also automate most of calls, which greatly reduces the cost and improves the operation efficiency.

At present, in the process of an IVR call, numbers 0 to 9 are usually displayed on a panel of a call terminal, and each of the numbers corresponds to an option. After a number is selected by a user, a corresponding voice service is provided for the user based on an option corresponding to the number.

The user has to finish listening to voice before pressing a key to select a needed option based on a prompt, which wastes time and sometimes causes a situation that the voice is not clearly heard. The manner of interacting with a service center simply based on numbers on a call panel is too simple and has limited interactive ability.

SUMMARY

In order to solve the problem in the conventional technology, a method for interactive response and an apparatus thereof are provided according to an embodiment of the present disclosure to improve the ability to interact with a service center. The technical solutions are described hereinafter.

According to a first aspect of the embodiments of the present disclosure, a method for interactive response is provided, which is applied to a user terminal. The method includes:

establishing a connection with a service terminal;

receiving display configuration corresponding to a service client on the service terminal;

constructing an interactive interface based on the display configuration, and displaying the interactive interface on the user terminal;

obtaining an input operation of a user on the interactive interface;

generating feedback information based on the input operation; and transmitting the feedback information to the service terminal, where the establishing a connection with a service terminal includes:

transmitting, by the user terminal, a call request to a network device; and receiving a call response message returned by the network device, after establishing a session initiation protocol (SIP) call supporting text transmission, between the network device and the service terminal.

According to a second aspect of the embodiments of the present disclosure, a method for interactive response is provided, which is applied to a service terminal. The method includes:

establishing a connection with a user terminal;

transmitting display configuration corresponding to a service client on the service terminal to the user terminal; and receiving feedback information transmitted by the user terminal, where the feedback information is generated based on an input operation of a user on an interactive interface constructed based on the display configuration, and the establishing a connection with a user terminal includes:

receiving a call request of a network device, after the user terminal initiating a call request; and establishing a session initiation protocol (SIP) call supporting text transmission, with the network device, to return a call response message to the user terminal via the network device.

According to a third aspect of the embodiments of the present disclosure, a user terminal is provided, which includes:

a first connection establishing module, configured to establish a connection with a service terminal;

a first receiving module, configured to receive display configuration corresponding to a service client on the service terminal;

an interface constructing module, configured to construct an interactive interface based on the display configuration, and display the interactive interface on the user terminal;

an obtaining module, configured to obtain an input operation of a user on the interactive interface;

a feedback information generating module, configured to generate feedback information based on the input operation; and a first transmitting module, configured to transmit the feedback information to the service terminal, where the first connection establishing module further includes:

a request transmitting unit, configured to transmit a call request to a network device; and a response receiving unit, configured to receive a call response message returned by the network device after establishing a session initiation protocol (SIP) call supporting text transmission, between the network device and the service terminal.

BRIEF DESCRIPTION OF THE DRAWINGS

In order to more clearly illustrate the technical solutions in the embodiments of the present disclosure, the drawings used in the description of the embodiments are introduced briefly hereinafter. Clearly, the drawings described herein are only some of the embodiments of the present disclosure, and other drawings may be obtained by those skilled in the art based on these drawings without inventive effort.

DETAILED DESCRIPTION OF THE EMBODIMENTS

For a better understanding of the object, technical solutions, and advantages of the present disclosure, the embodiments of the present disclosure are further described in detail hereinafter in conjunction with the drawings.

Figure 1:
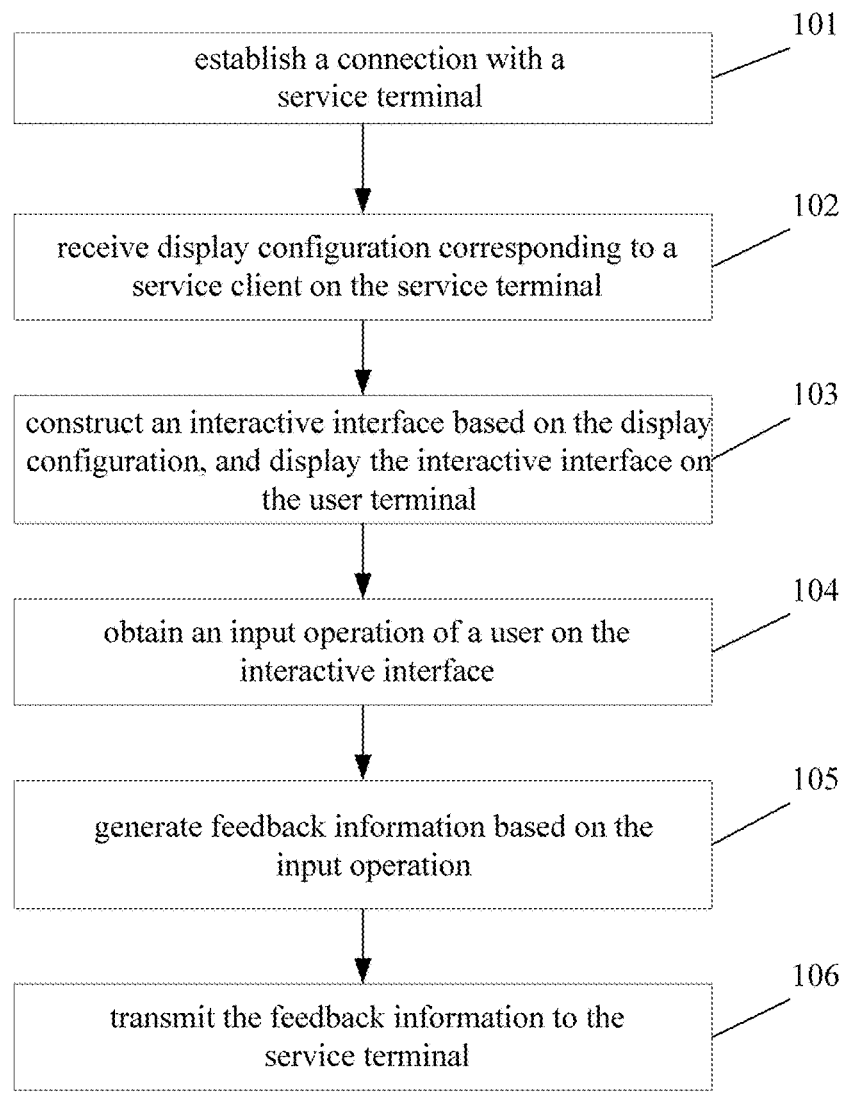
FIG. 1 is a flow chart of a method for interactive response according to an embodiment of the present disclosure.

FIG. 1 is a flow chart of interactive response according to an embodiment of the present disclosure. The method for interactive response may be applied to a user terminal. The method for interactive response includes steps 101 to 106.

In step 101, a connection with a service terminal is established.

In step 102, display configuration corresponding to a service client on the service terminal is received.

In step 103, an interactive interface is constructed based on the display configuration, and the interactive interface is displayed on the user terminal.

In step 104, an input operation of a user on the interactive interface is obtained.

In step 105, feedback information is generated based on the input operation.

In step 106, the feedback information is transmitted to the service terminal.

In an embodiment, the step 101 may include:

Transmitting, by the user terminal, a call request to a network device; and receiving a call response message returned by the network device, after establishing a session initiation protocol (SIP) call supporting text transmission, between the network device and the service terminal.

Figure 2:
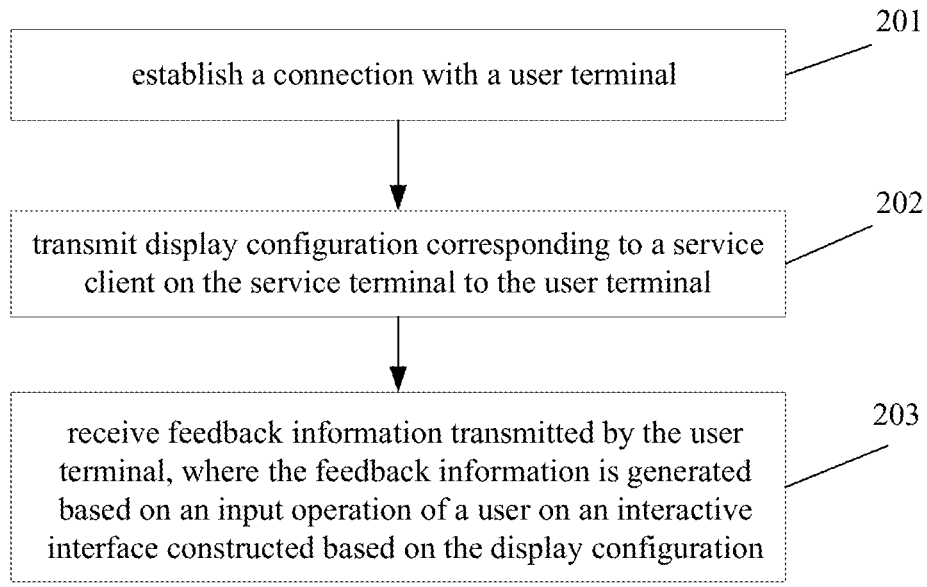
FIG. 2 is a flow chart of a method for interactive response according to an embodiment of the present disclosure.

FIG. 2 is a flow chart of interactive response according to another embodiment of the present disclosure. The method for interactive response may be applied to a service terminal. The method for interactive response includes steps 201 to 203.

In step 201, a connection with a user terminal is established.

In step 202, display configuration corresponding to a service client on the service terminal is transmitted to the user terminal.

In step 203, feedback information transmitted by the user terminal is received, where the feedback information is generated based on an input operation of a user on an interactive interface constructed based on the display configuration.

In an embodiment, the step 201 may include:

receiving a call request of a network device, after the user terminal initiating a call request; and establishing a session initiation protocol (SIP) call supporting text transmission, with the network device, to return a call response message to the user terminal via the network device.

Figure 3:
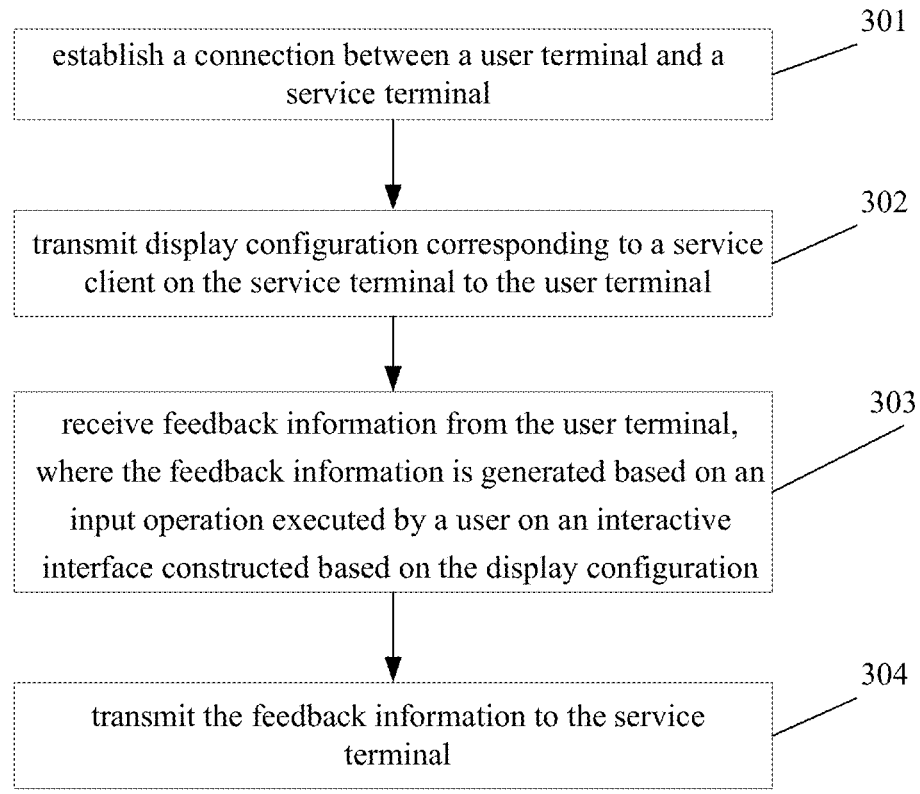
FIG. 3 is a flow chart of a method for interactive response according to an embodiment of the present disclosure.

FIG. 3 is a flow chart of interactive response according to another embodiment of the present disclosure. The method for interactive response may be performed by a processor. The method for interactive response includes steps 301 to 304.

In step 301, a connection is established between a user terminal and a service terminal.

In step 302, display configuration corresponding to a service client on the service terminal is transmitted to the user terminal.

In step 303, feedback information is received from the user terminal, where the feedback information is generated based on an input operation executed by a user on an interactive interface constructed based on the display configuration.

In step 304, the feedback information is transmitted to the service terminal.

In an embodiment, the step 301 may include:

receiving a call request of the user terminal;

transmitting an SIP invite message to service terminal, where a header field of the SIP invite message carries information about a data exchange format supported by the user terminal; and receiving an SIP response message returned by the service terminal, establishing an SIP call supporting text transmission, with the service terminal, and returning a call response message to the user terminal.

Figure 4:
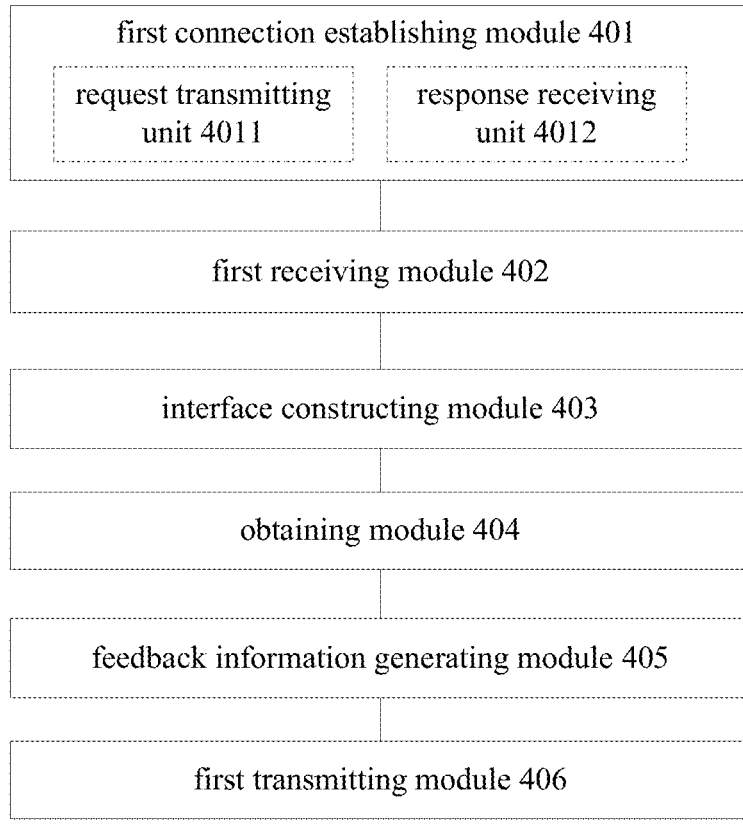
FIG. 4 is a structural block diagram of an apparatus for interactive response according to an embodiment of the present disclosure.

FIG. 4 is a schematic diagram of an apparatus for interactive response according to an embodiment of the present disclosure. The apparatus for interactive response may be applied to a user terminal, which includes:

a first connection establishing module 401, configured to establish a connection with a service terminal;

a first receiving module 402, configured to receive display configuration corresponding to a service client on the service terminal;

an interface constructing module 403, configured to construct an interactive interface based on the display configuration, and display the interactive interface on the user terminal;

an obtaining module 404, configured to obtain an input operation of a user on the interactive interface;

a feedback information generating module 405, configured to generate feedback information based on the input operation; and a first transmitting module 406, configured to transmit the feedback information to the service terminal.

In an embodiment, the first connection establishing module 401 includes:

a request transmitting unit 4011, configured to transmit a call request to a network device; and a response receiving unit 4012, configured to receive a call response message returned by the network device after establishing a session initiation protocol SIP call supporting text transmission, between the network device and the service terminal.

Figure 5:
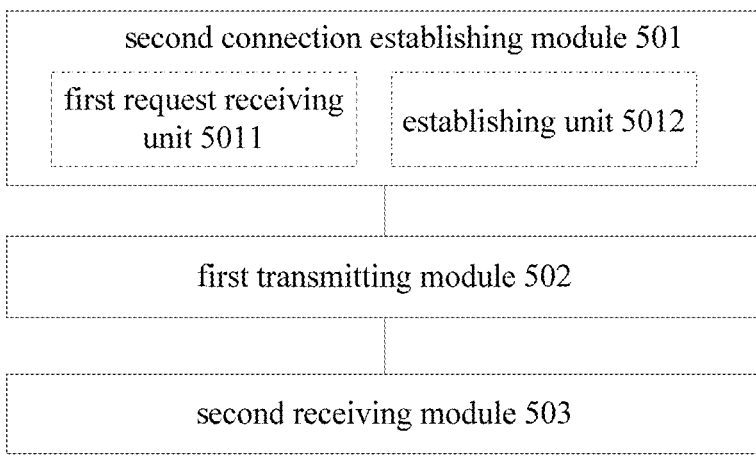
FIG. 5 is a structural block diagram of an apparatus for interactive response according to an embodiment of the present disclosure.

FIG. 5 is a schematic diagram of an apparatus for interactive response according to another embodiment of the present disclosure. The apparatus for interactive response may be applied to a service terminal, which includes:

a second connection establishing module 501, configured to establish a connection with a user terminal;

a first transmitting module 502, configured to transmit display configuration corresponding to a service client on the service terminal to the user terminal; and a second receiving module 503, configured to receive feedback information transmitted by the user terminal, where the feedback information is generated based on an input operation of a user on an interactive interface constructed based on the display configuration.

In an embodiment, the second connection establishing module 501 includes:

a first request receiving unit 5011, configured to receive a call request of a network device after the user terminal initiating a call request; and an establishing unit 5012, configured to establish an SIP call supporting text transmission, with the network device, to return a call response message to the user terminal via the network device.

Figure 6:
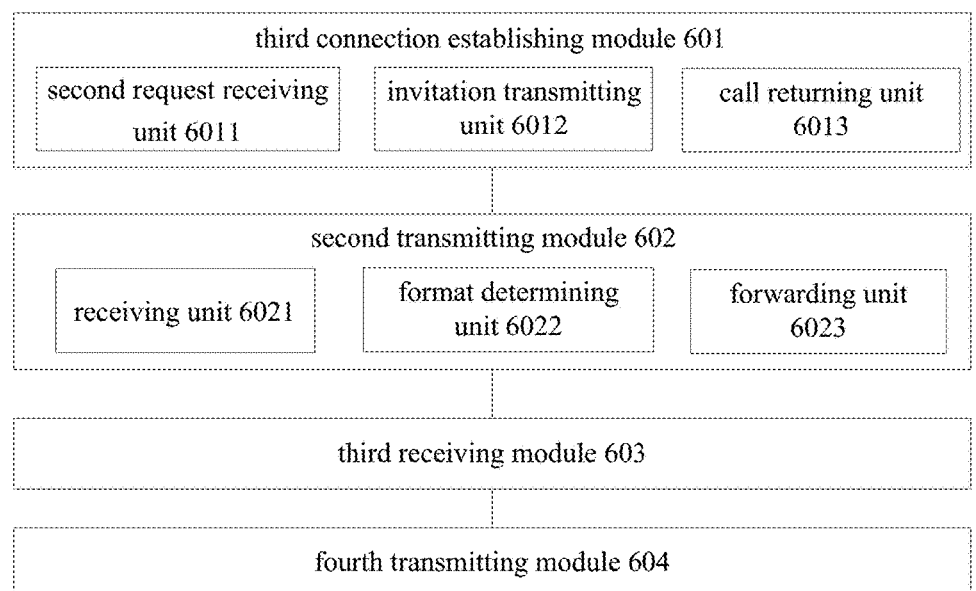
FIG. 6 is a structural block diagram of an apparatus for interactive response according to an embodiment of the present disclosure.

FIG. 6 is a schematic diagram of an apparatus for interactive response according to another embodiment of the present disclosure. The apparatus for interactive response may include a processor, and further includes:

a third connection establishing module 601, configured to establish a connection between a user terminal and a service terminal;

a second transmitting module 602, configured to transmit display configuration corresponding to a service client on the service terminal to the user terminal;

a third receiving module 603, configured to receive feedback information from the user terminal, where the feedback information is generated based on an input operation executed by a user on an interactive interface constructed based on the display configuration; and a fourth transmitting module 604, configured to transmit the feedback information to the service terminal.

In an embodiment, the second transmitting module 602 further includes:

a receiving unit 6021, configured to receive an INFO message transmitted by the service terminal;

a format determining unit 6022, configured to read information about a data exchange format from a content-type field in a message header of the INFO message, and determine that currently transmitted content is of the data exchange format; and a forwarding unit 6023, configured to read text content of each option on a navigation menu from a message body of the INFO message and forward the text content to the user terminal.

In an embodiment, the third connection establishing module 601 includes:

a second request receiving unit 6011, configured to receive a call request of the user terminal;

an invitation transmitting unit 6012, configured to transmit an SIP invite message to service terminal, where a header field of the SIP invite message carries information about a data exchange format supported by user terminal; and a call returning unit 6013, configured to receive an SIP response message returned by the service terminal, establish an SIP call supporting text transmission, with the service terminal, and return a call response message to the user terminal.

Based on the above technical solutions, a problem that a user has to finish listening to voice before determining a number corresponding to a target service in a case of multiple types of services and application scope is limited due to the single input manner of the user is solved. And the user can intuitively obtain information such as text information or video information from a menu interface, which improves the speed and accuracy of obtaining information for the user.

Figure 7:
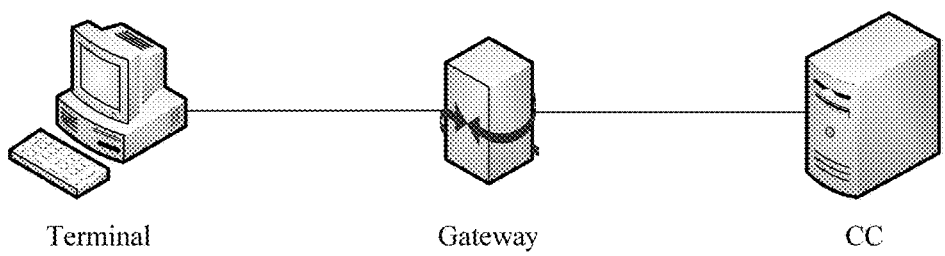
FIG. 7 is a schematic diagram of a network architecture according to an embodiment of the present disclosure.

The methods for interactive response according to the embodiments of the present disclosure may be applied to a network architecture shown in FIG. 7. As shown in FIG. 7, the network architecture includes a user terminal, a gateway and a call center (CC). The CC may provide corresponding call services including services in various fields for the user terminal via a call established with the user terminal. The call established between the user terminal and the CC and a response process therebetween are all forwarded by the gateway (GW). A call between the CC and the gateway and an interactive process therebetween are achieved based on the SIP. Text content transmitted between the gateway and the CC may be edited in a data exchange format, and the data exchange format includes but not limited to: JavaScript object notation (JSON) or extensible markup language (XML). An interactive response process relates to the following messages of the SIP: an INFO message belong to an extended operation, used to convey a message; an INVITE message belonging to a call control request process, used to initiate a call and describe a session; a 200 OK message belonging to a call control request process, used by a called party to respond to an INVITE message of a calling party; and an ACK message belonging to a call control request process, used by a calling party to determine that a 200 OK message of a called party is received. Specific descriptions are provided hereinafter in conjunction with embodiments.

Figure 8:
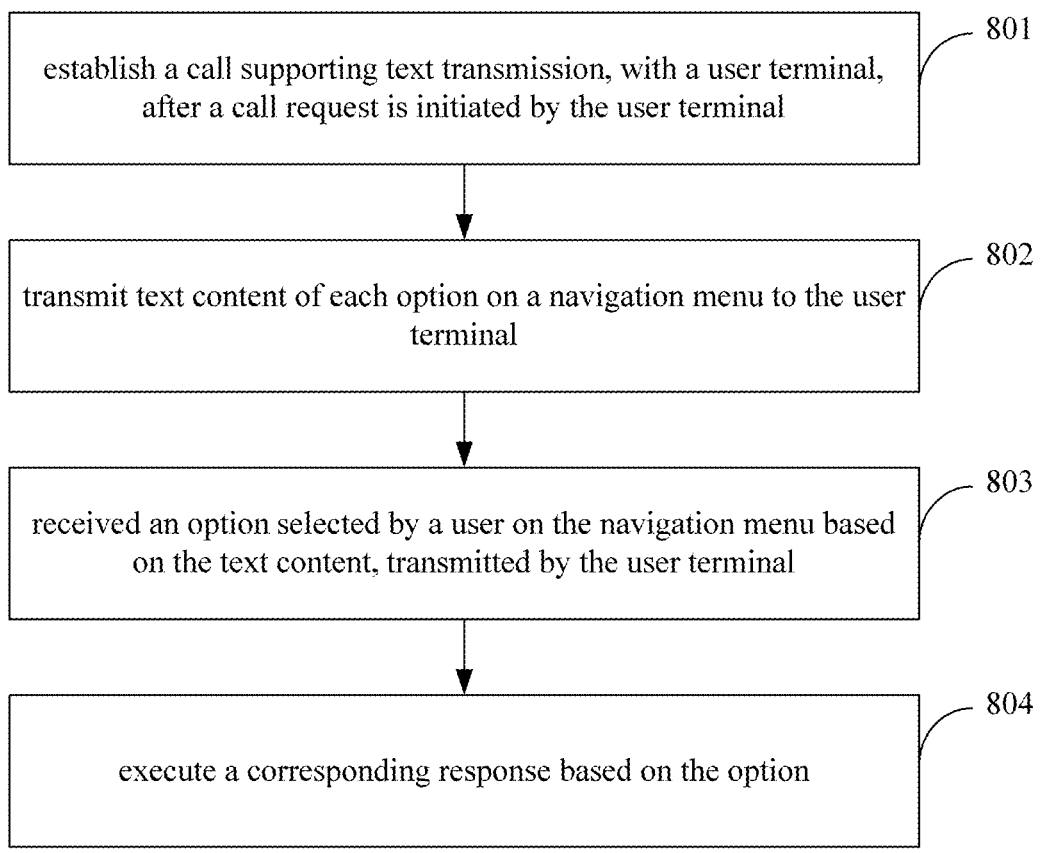
FIG. 8 is a flow chart of a method for interactive response according to an embodiment of the present disclosure.

As shown in FIG. 8, a method for interactive response is provided according to an embodiment of the present disclosure, which includes steps 801 to 804.

In step 801, a call supporting text transmission, with a user terminal is established, after a call request is initiated by the user terminal.

In step 802, text content of each option on a navigation menu is transmitted to the user terminal.

The navigation menu is to be displayed on a screen of the user terminal. The navigation menu includes multiple options, each of which corresponds to a service. The embodiment places emphasis on the display of text, and all of the layout, background, option size and color of the navigation menu may be set based on needs, which are not limited by the present disclosure and are not described herein. In addition, the manner of displaying the navigation menu on the screen of the user terminal effectively gets rid of the limitation of the conventional digital display that at most ten options can be provided, and more options can be set based on actual needs to meet different user requirements.

In step 803, an option, which is selected by a user on the navigation menu based on the text content, transmitted by the user terminal is received.

In step 804, a corresponding response is executed based on the option.

Figure 9:
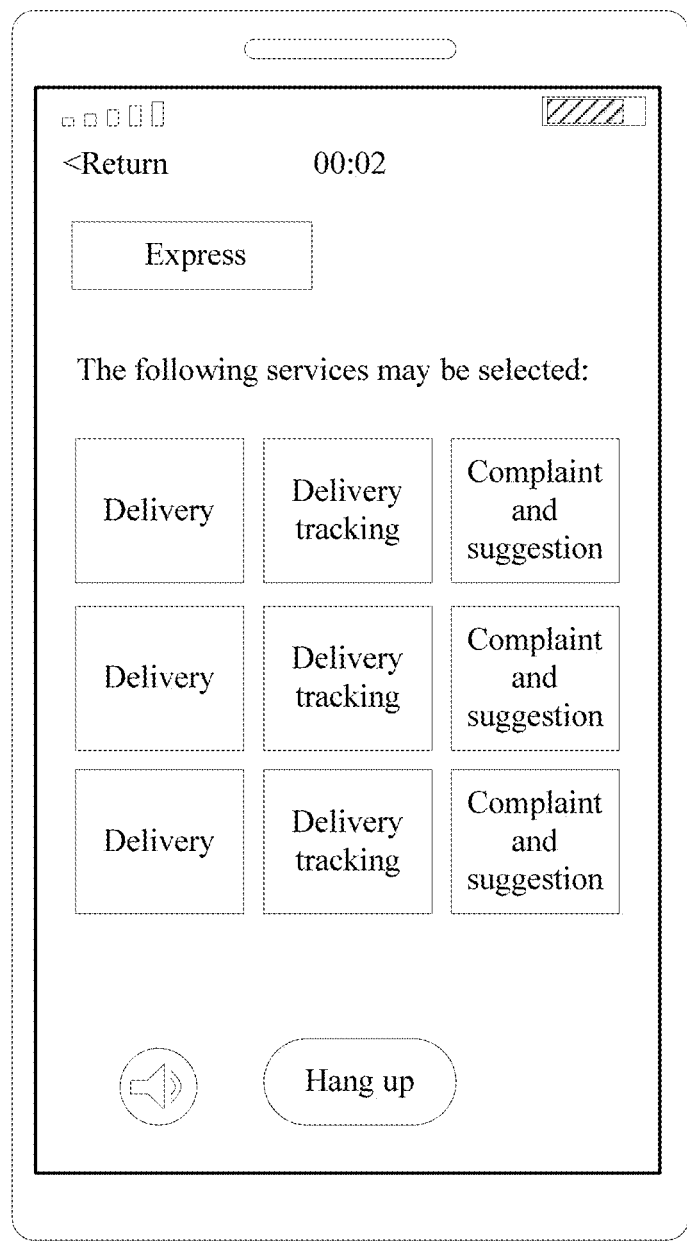
FIG. 9 is a schematic diagram of displaying a navigation menu on a terminal according to an embodiment of the present disclosure.

Reference is made to FIG. 9, which is a schematic diagram of displaying a navigation menu on a user terminal according to another embodiment of the present disclosure. In the figure, the interactive response is an express service, and each option is expressed by text on the navigation menu, such as "delivery", "delivery tracking" and "complaint and suggestion". A user may know the content of the each option intuitively based on the displayed text and click an option quickly. When a corresponding option is selected by the user, a call center may execute a corresponding response based on the option. For example, if the user clicks "delivery", a response of delivery may be executed.

In an embodiment, the establishing a call supporting text transmission, with a user terminal, after a call request is initiated by the user terminal may include: receiving a call request, transmitted by a gateway after the user terminal is triggered, establishing an SIP call supporting text transmission, with the gateway, and returning a call response message by the gateway to the user terminal.

In an embodiment, the transmitting text content of each option on a navigation menu to the user terminal may include: transmitting an INFO message to a gateway, and forwarding by the gateway the text content of the each option on the navigation menu to the user terminal, where a content-type field in a message header of the INFO message is information about a data exchange format, and a message body of the INFO message includes the text content of the each option on the navigation menu which is edited in the data exchange format.

In an embodiment, the receiving a call request, transmitted by a gateway after the user terminal is triggered, establishing an SIP calls supporting text transmission, with the gateway may include:

receiving an SIP invite message, transmitted by the gateway after the call request is initiated by the user terminal, where a header field of the SIP invite message carries information about a data exchange format supported by the user terminal; and after determining that the data exchange format is supported, returning an SIP response message to the gateway, and establishing the SIP call supporting text transmission, with the gateway.

In an embodiment, the executing a corresponding response based on the option may include:

transmitting text content on a sub-menu corresponding to the option to the user terminal;

receiving text information input by the user on the sub-menu which is transmitted by the user terminal; and executing corresponding processing based on the text information input by the user.

In the embodiment, the data exchange format may be JSON, or XML, etc.

In the above method according to the embodiment, the call supporting text transmission, with the user terminal is established after the call request is initiated by the user terminal; the text content of the each option on the navigation menu is transmitted to the user terminal; the option selected by the user on the navigation menu based on the text content, transmitted by the user terminal is received; and the corresponding response is executed based on the option. In this way, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is improved.

Figure 10:
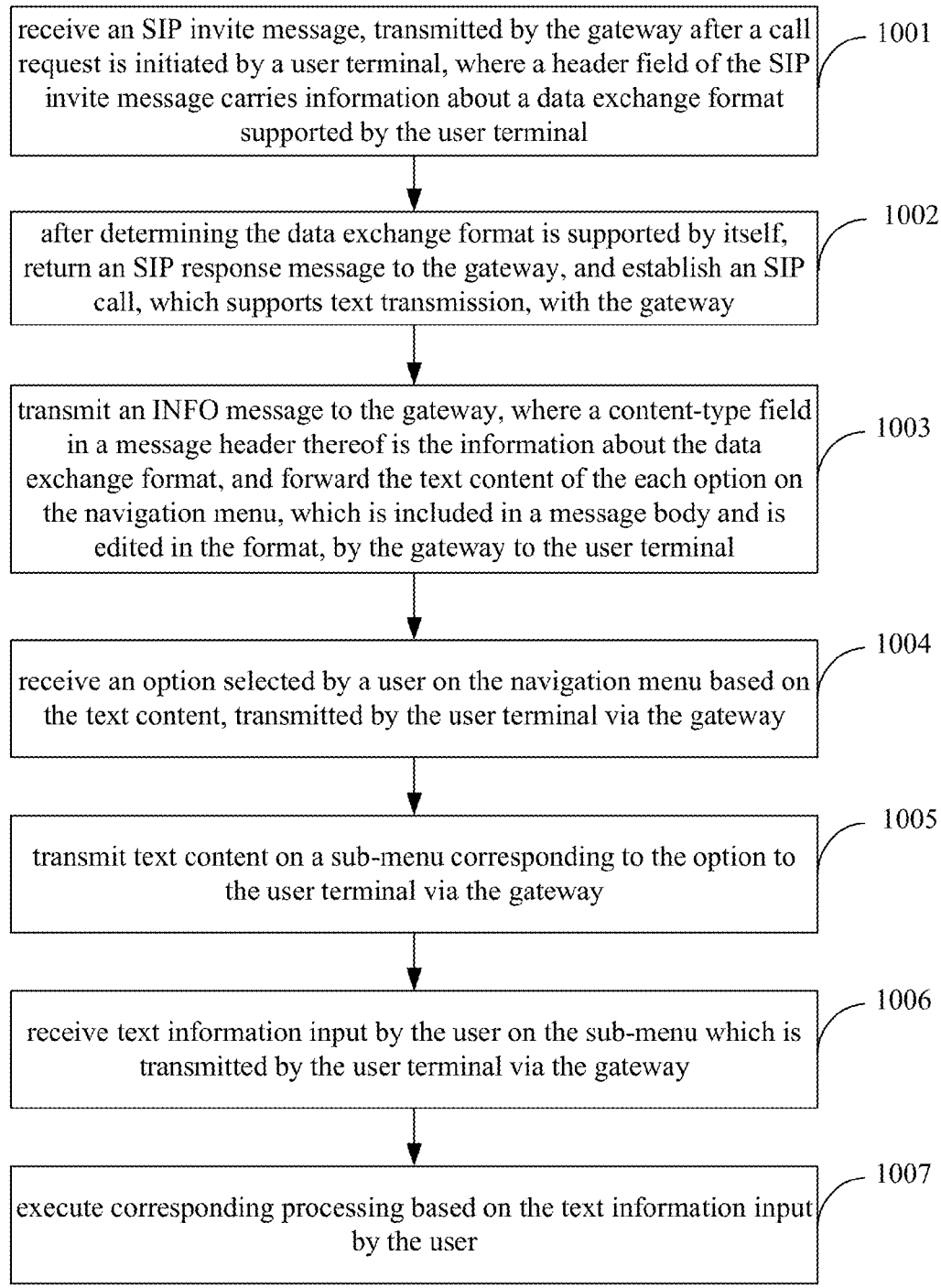
FIG. 10 is a flow chart of a method for interactive response according to an embodiment of the present disclosure.

As shown in FIG. 10, a method for interactive response is provided according to another embodiment of the present disclosure, which includes steps 1001 to 1007.

In step 1001, an SIP invite message, transmitted by a gateway after a call request is initiated by a user terminal, is received, where a header field of the SIP invite message carries information about a data exchange format supported by the user terminal.

Message interaction with the user terminal may be transferred by the gateway. The data exchange format supported by the user terminal may be any data exchange format satisfying the requirement of text transmission, which is not limited by the embodiment.

In step 1002, after determining the data exchange format is supported, an SIP response message is returned to the gateway, and an SIP call supporting text transmission, with the gateway is established.

In the embodiment, if it is determined that the data exchange format is not supported by itself, no SIP response message is returned to the user terminal and the establishment of the call is failed. If it is determined that the data exchange format is supported by itself, an SIP response message is returned to the user terminal, the process of establishing the call with the user terminal is completed, and the two sides can start to communicate with each other.

In step 1003, an INFO message is transmitted to the gateway. A content-type field in a message header of the INFO message is the information about the data exchange format, and a message body of the INFO message includes the text content of the each option on the navigation menu which is edited in the data exchange format. The text content of the each option on the navigation menu is forwarded by the gateway to the user terminal.

In the embodiment, SIP is modified. The supported data exchange format is identified by the content-type field in the INFO message header. For example, "content-type=application/ivr.json" is used to identify that text is transmitted in a JSON format, and text content edited in the JSON format is added to the INFO message body. Based on the manner of adding the text content which is of the JSON format to the INFO message body, the SIP is capable of transmitting text.

In step 1004, an option selected by a user on the navigation menu based on the text content, transmitted by the user terminal via the gateway is received.

In step 1005, text content on a sub-menu corresponding to the option is transmitted to the user terminal via the gateway.

In the embodiment, each option on the navigation menu may correspond to multilevel sub-menus, and the corresponding sub-menu may be pushed based on a selection of the user. A function that a user can input text may be set in the corresponding sub-menu based on functional requirements, thereby achieving text interaction with the user terminal.

In step 1006, text information input by the user on the sub-menu which is transmitted by the user terminal via the gateway is received.

In step 1007, corresponding processing is executed based on the text information input by the user.

Figure 11:
FIG. 11 is a schematic diagram of inputting text on a terminal to perform interaction according to an embodiment of the present disclosure.

Reference is made to FIG. 11, which is a schematic diagram of inputting text on a user terminal to perform interaction according to another embodiment of the present disclosure. In conjunction with the example shown in FIG. 9, after the option "delivery" is clicked by a user, a corresponding sub-menu is transmitted to the user terminal. The sub-menu is shown in FIG. 11. "province/city/district", "detailed address", "phone number", etc., may be input by the user in the sub-menu. After the information is filled in, "submit order" may be clicked to complete a request of delivery. The above various kinds of information input by the user is transferred to a CC via an INFO message for performing corresponding delivery processing.

Figure 12:
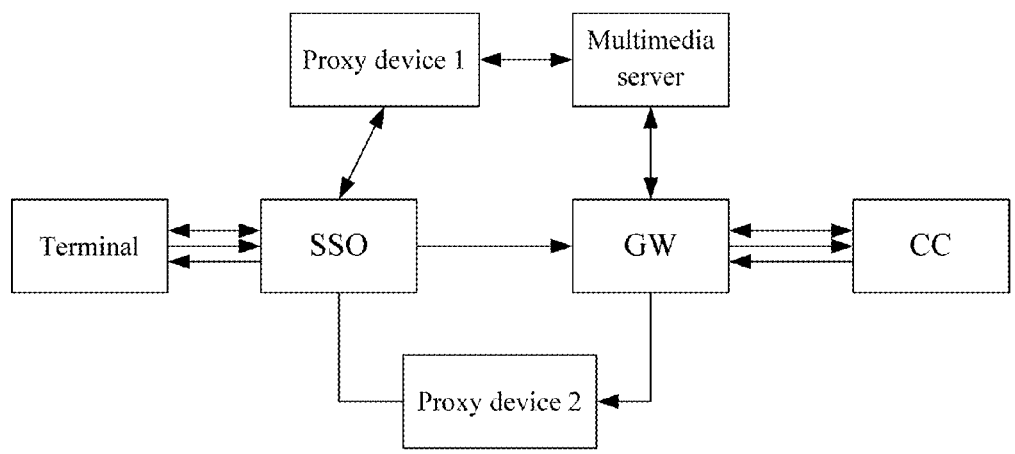
FIG. 12 is a schematic diagram of an application scenario of a method for interactive response according to an embodiment of the present disclosure.

Reference is made to FIG. 12, which is a schematic diagram of an application scenario of interactive response according to another embodiment of the present disclosure. A user establishes a call supporting text transmission, with a CC via single sign on (SSO), a proxy device 1, a multimedia server and a GW. Bidirectional arrows in the figure represent interactive processes of call request and call response. After the call is established, the user transmits content to CC via the SSO and the GW, and the CC returns response content to the user terminal via the GW, a proxy device 2 and the SSO, thereby completing an interactive response process between the user terminal and the CC. The multimedia server may provide multimedia services for the user terminal. For example, the multimedia server may provide voice and image services on an interactive response menu. The SSO refers to that a user can access all the multiple application systems which trust each other by logging in for just one time. The proxy device 1 and the proxy device 2 are used to transfer messages, which are not described herein. In the above process, the emphasis of the present disclosure lies on remodeling an SIP message between the GW and the CC to achieve text transmission of the SIP message, thereby achieving an effect of display text on an interactive response interface.

Figure 13:
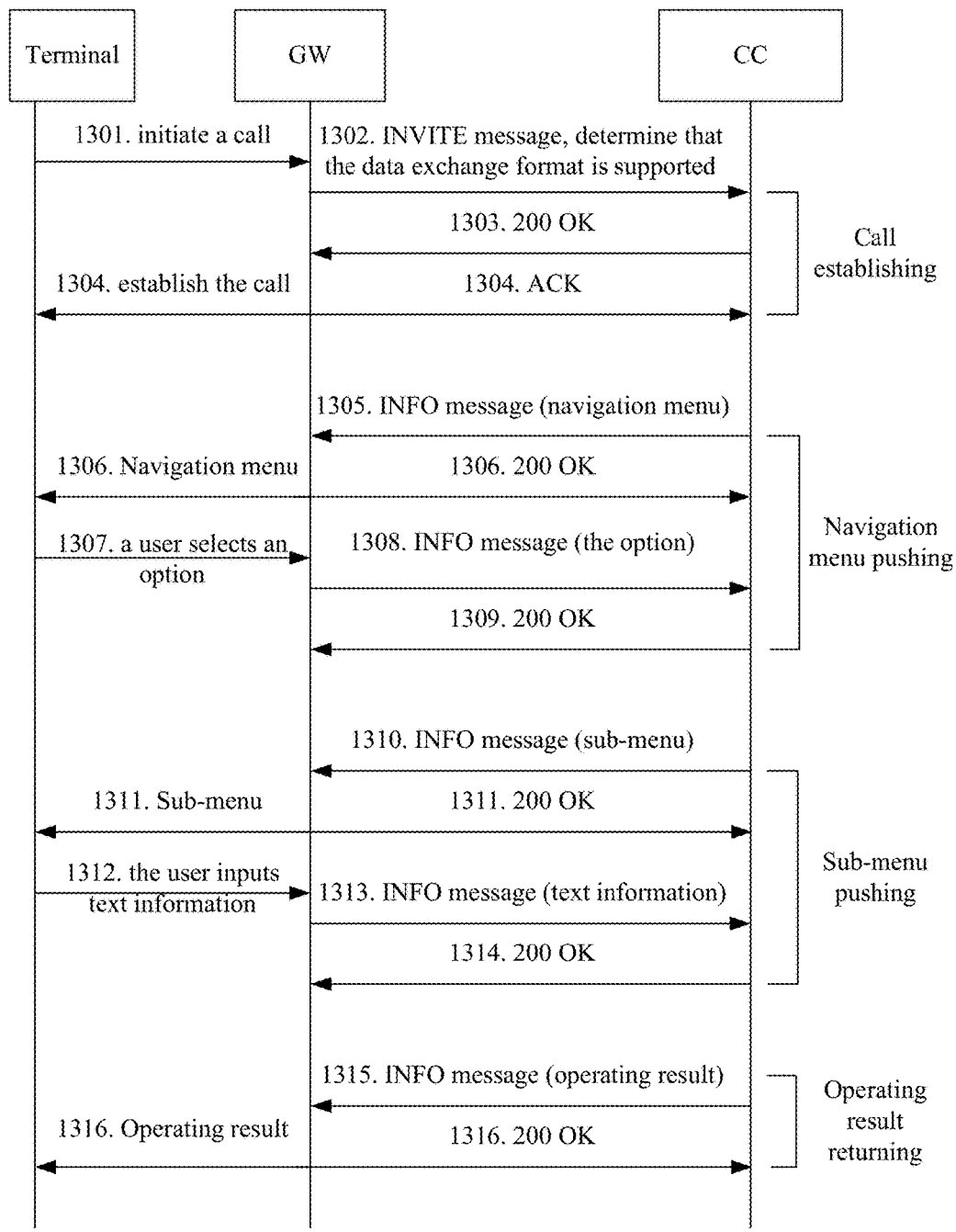
FIG. 13 is a schematic diagram of interaction in a method for interactive response according to an embodiment of the present disclosure.

Reference is made to FIG. 13, which is a schematic diagram of interaction among a user terminal, a gateway and a call center according to another embodiment of the present disclosure. The interactive process includes: a call establishing process, a navigation menu pushing process, a sub-menu pushing process and an operating result returning process. The call establishing process may include: the user terminal initiates a call to the GW; the GW establishes an SIP call supporting text transmission, with the CC; the CC returns a response to the GW; and the GW returns a response to the user terminal, a call supporting text transmission, between the user terminal and the CC, is completed. The navigation menu pushing process may include: the CC transmits text content of a navigation menu to the GW; the GW forwards the text content to the user terminal; and the user terminal displays the content and then transmits an option selected by a user to the CC via the GW. The sub-menu pushing process may include: the CC transmits a sub-menu to the user terminal via the GW, and the user terminal transmits text input by the user to the CC via the GW, to complete an interaction. The operating result returning process may include: the CC executes a corresponding operation after receiving the text input by the user, and returns an operating result to the user terminal via the GW. The above processes specifically include steps 1301 to 1316.

In step 1301, the user terminal initiates a call.

In step 1302, after receiving the call of the user terminal, the gateway GW transmits an SIP INVITE message to the CC, where the SIP INVITE message carries a data exchange format supported by the user terminal, such as JSON.

In step 1303, after receiving the message, the CC determines that it supports the data exchange format, and replies to the GW with a 200 OK message.

In step 1304, after receiving the 200 OK message, the GW replies to the CC with an ACK to complete the establishment of an SIP call with the CC, and replies to the user terminal with a response message.

In step 1305, the CC transmits text content of a navigation menu to the GW via an INFO message.

In step 1306, after receiving the INFO message, the GW transmits the text content of the navigation menu therein to the user terminal, and replies to the CC with a 200 OK message.

In step 1307, a user of the user terminal selects an option based on the displayed navigation menu.

In step 1308, the GW transmits the option selected by the user to the CC via an INFO message.

In step 1309, after receiving the INFO message, the CC replies to the GW with a 200 OK message.

In step 1310, the CC determines text content of a corresponding sub-menu based on the option and transmits the text content to the GW via an INFO message.

In step 1311, the GW replies to the CC with a 200 OK message, and transmits the text content of the sub-menu to the user terminal for displaying.

In step 1312, the user inputs text information in the sub-menu.

In step 1313, the GW transmits the text information input by the user to the CC via an INFO message.

In step 1314, after receiving the INFO message, the CC replies to the GW with a 200 OK message.

In step 1315, the CC performs corresponding processing based on the text information input by the user, and returns an operating result to the GW via an INFO message.

In step 1316, after receiving the operating result, the GW replies to the CC with a 200 OK message, and transmits the operating result to the user terminal.

Based on the above method according to the embodiment, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved. In addition, text may be used to perform interaction in a call process. That is, a user may input a text message to perform operations, such as self-service ordering and order inquiry, to achieve text interaction, which further improves the interactive function.

Figure 14:
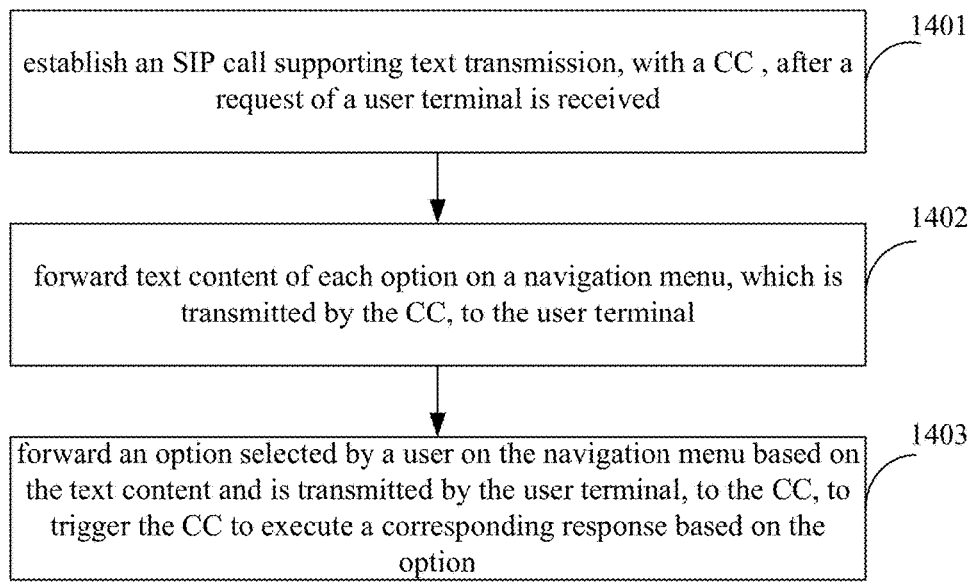
FIG. 14 is a flow chart of a method for interactive response according to an embodiment of the present disclosure.

As shown in FIG. 14, a method for interactive response is provided according to another embodiment of the present disclosure, which includes steps 1401 to 1403.

In step 1401, an SIP call supporting text transmission, with a CC is established, after a request of a user terminal is received.

In step 1402, text content of each option on a navigation menu, which is transmitted by the CC, is forwarded to the user terminal.

In step 1403, an option selected by a user on the navigation menu based on the text content, transmitted by the user terminal is forwarded to the CC, to trigger the CC to execute a corresponding response based on the option.

The above method according to the embodiment may be implemented by a gateway.

In an embodiment, the forwarding text content of each option on a navigation menu, which is transmitted by the CC, to the user terminal may include:

receiving an INFO message transmitted by the CC;

reading information about a data exchange format from a content-type field in a message header of the INFO message, and determining that the currently transmitted content is of the data exchange format; and reading the text content of the each option on the navigation menu from a message body of the INFO message, and forwarding the text content to the user terminal.

In an embodiment, the establishing an SIP call supporting text transmission, with a call center CC, after a request of a user terminal is received may include:

after receiving the request of the user terminal, transmitting an SIP invite message to the CC, where a header field of the SIP invite message carries information about a data exchange format supported by the user terminal; and receiving an SIP response message returned by the CC, establishing an SIP call supporting text transmission, with the CC, and returning a call response message to the user terminal.

In an embodiment, the method may further include:

transmitting text content on a sub-menu corresponding to the option which is transmitted by the CC to the user terminal; and forwarding text information input by the user on the sub-menu which is transmitted by the user terminal, to the CC, and triggering the CC to execute corresponding processing.

In the embodiment, the data exchange format may be JSON or XML.

Based on the above method according to the embodiment, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

Figure 15:
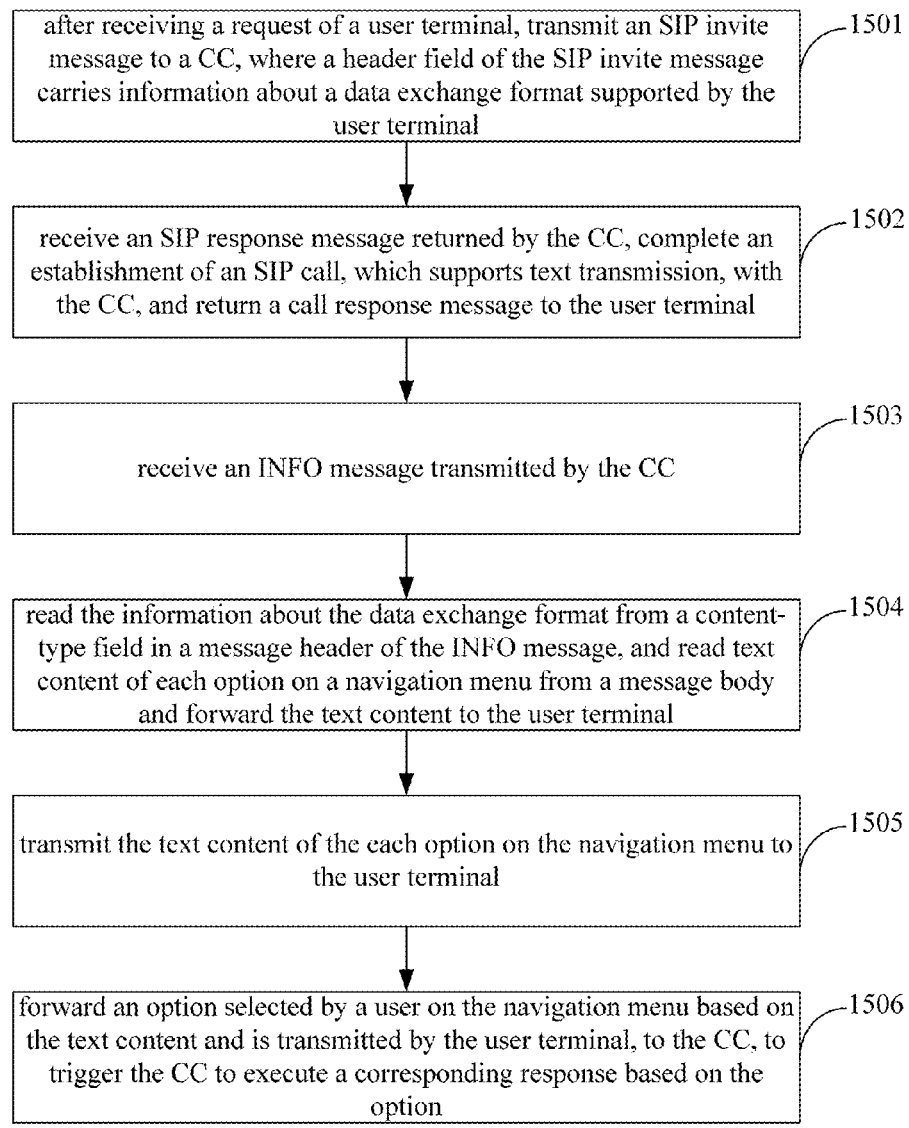
FIG. 15 is a flow chart of a method for interactive response according to an embodiment of the present disclosure.

As shown in FIG. 15, a method for interactive response is provided according to another embodiment of the present disclosure, which includes steps 1501 to 1506.

In step 1501, after receiving a request of a user terminal, an SIP invite message is transmitted to a CC. A header field of the SIP invite message carries information about a data exchange format supported by the user terminal.

In step 1502, an SIP response message returned by the CC is received, an establishment of an SIP call supporting text transmission, with the CC is completed, and a call response message is returned to the user terminal.

In step 1503, an INFO message transmitted by the CC is received.

In step 1504, the information about the data exchange format is read from a content-type field in a message header of the INFO message, and it is determined that the current transmitted content is of the data exchange format; and text content of each option on a navigation menu is read from a message body of the INFO message and is forwarded to the user terminal.

In step 1505, the text content of the each option on the navigation menu is transmitted to the user terminal.

In step 1506, an option selected by a user on the navigation menu based on the text content, transmitted by the user terminal is forwarded to the CC, to trigger the CC to execute a corresponding response based on the option.

Furthermore, the above method may further includes:

transmitting text content on a sub-menu corresponding to the option transmitted by the CC to the user terminal; and forwarding text information input by the user on the sub-menu transmitted by the user terminal, to the CC, and triggering the CC to execute corresponding processing.

In the embodiment, the data exchange format may be JSON or XML.

Based on the above method according to the embodiment, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

Figure 16:
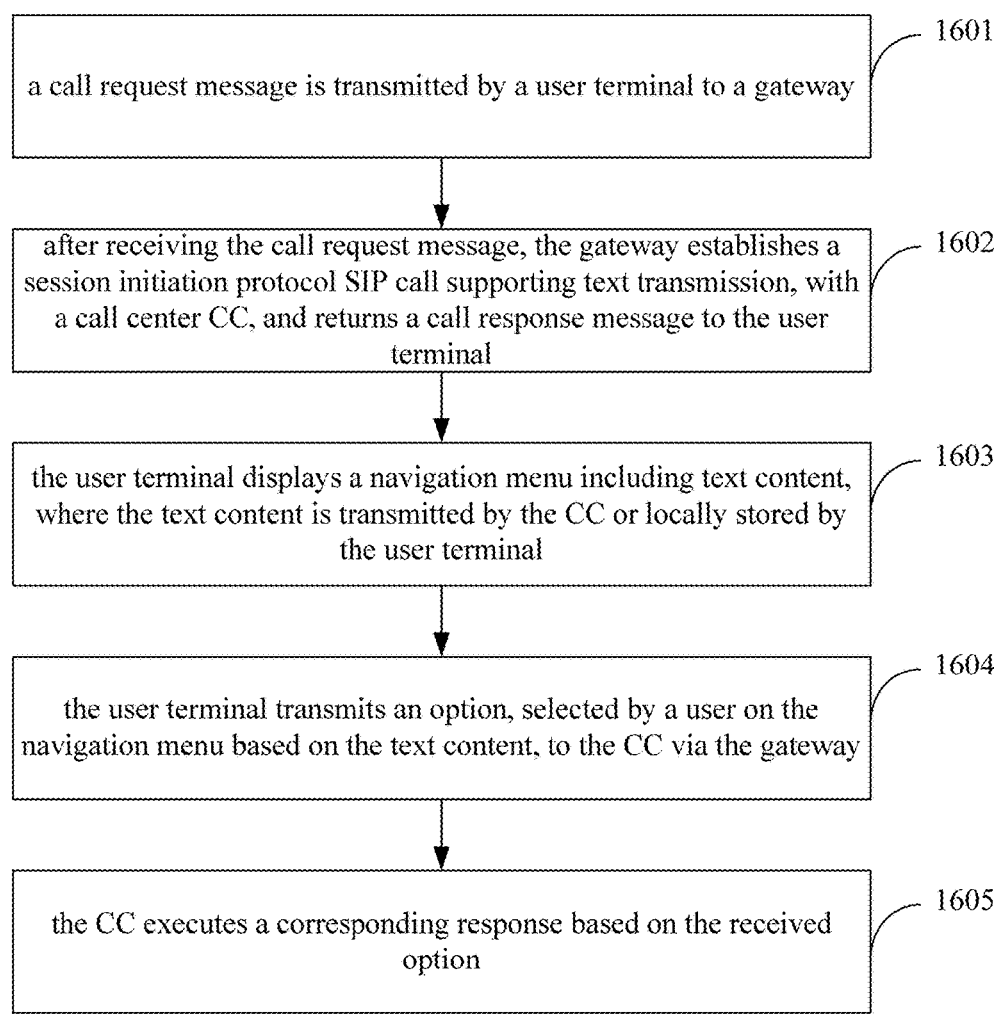
FIG. 16 is a flow chart of a method for interactive response according to an embodiment of the present disclosure.

As shown in FIG. 16, a method for interactive response is provided according to another embodiment of the present disclosure, which includes steps 1601 to 1605.

In step 1601, a call request message is transmitted by a user terminal to a gateway.

In step 1602, after receiving the call request message, the gateway establishes an SIP call, which supports text transmission, with a call center CC, and returns a call response message to the user terminal.

In step 1603, the user terminal displays a navigation menu including text content. The text content is transmitted by the CC or locally stored by the user terminal.

If the user terminal has locally stored the navigation menu, it may display the navigation menu on an interface directly. If the user terminal only stores a template of the navigation menu locally without the text content, the CC may transmit the text content of the navigation menu to the user terminal, and the user terminal invokes the locally stored template and adds the text content thereto after receiving the text content, thereby achieving the object of displaying the navigation menu. The template includes other information in the navigation menu except the text content, and includes but not limited to: layout, background, images, font color, size, voice, etc., which is not limited by the embodiment.

In step 1604, the user terminal transmits an option selected by a user on the navigation menu based on the text content, to the CC via the gateway.

In step 1605, the CC executes a corresponding response based on the received option.

Based on the above method according to the embodiment, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

Figure 17:
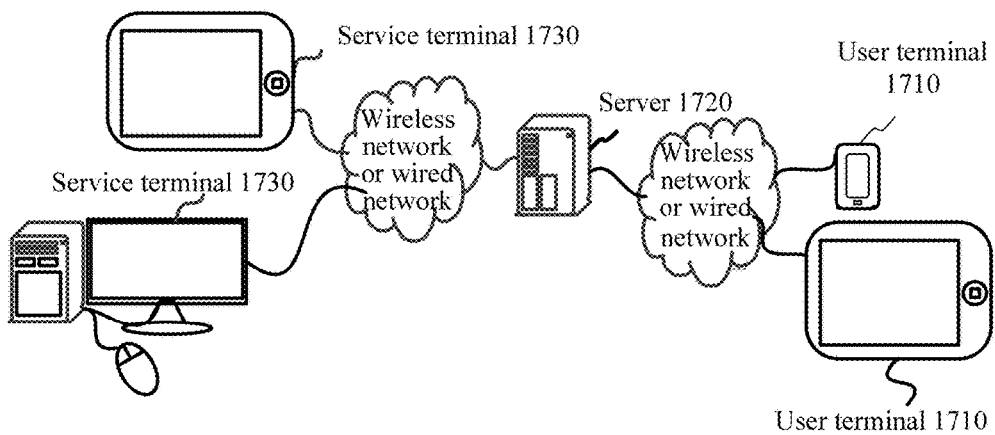
FIG. 17 is a schematic diagram of an implementation environment of a method for interactive response according to an embodiment of the present disclosure.

In another embodiment of the present disclosure, FIG. 17 is a schematic diagram of an implementation environment related to methods for interactive response according to various embodiments of the present disclosure. The implementation environment includes a user terminal 1710, a server 1720 and a service terminal 1730.

The user terminal is an electronic device on which a user client runs. The user client may be an instant messaging client or a social application client used by a user. The electronic device may be a mobile phone, a tablet computer, an e-book reader, a MP3 (Moving Picture Experts Group Audio Layer III) player, a MP4 (Moving Picture Experts Group Audio Layer IV) player, a portable laptop computer, a desktop computer, etc.

The user terminal 1710 and the server 1720 may connect with each other via a wireless network or a wired network.

The server 1720 may be a server, a server cluster consisting of several servers or a cloud computing service center.

The server 1720 and the service terminal 1730 may connect with each other via a wireless network or a wired network.

The service terminal 1730 is an electronic device on which a service client runs. The service client may be an instant messaging client or a social application client used by a service provider. The electronic device may be a mobile phone, a tablet computer, an e-book reader, a MP3 (Moving Picture Experts Group Audio Layer III) player, a MP4 (Moving Picture Experts Group Audio Layer IV) player, a portable laptop computer, a desktop computer, etc.

In order to simplify the description, only that methods for interactive response are applied to the implementation environment shown in FIG. 17 is illustrated hereinafter, which is not limited herein.

Figure 18:
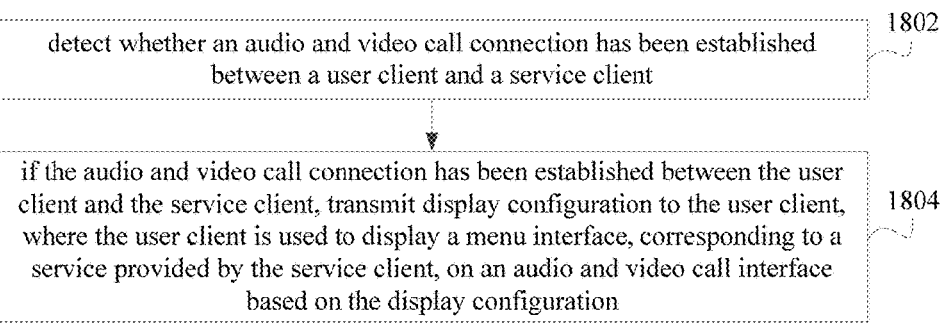
FIG. 18 is a flow chart of a method for interactive response according to an embodiment of the present disclosure.

Reference is made to FIG. 18, which shows a flow chart of a method for interactive response according to an embodiment of the present disclosure. In the embodiment, that the method for interactive response is applied to the server 1720 shown in FIG. 17 is illustrated. The method includes steps 1802 to 1804.

In step 1802, it is detected whether an audio and video call connection has been established between a user client and a service client.

In step 1804, if the audio and video call connection has been established between the user client and the service client, display configuration is transmitted to the user client. The user client is used to display a menu interface, corresponding to a service provided by the service client, on an audio and video call interface based on the display configuration.

Figure 19:
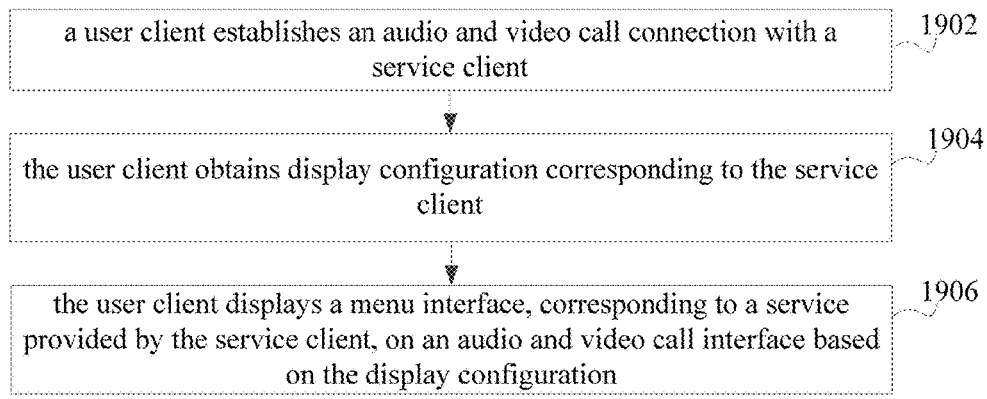
FIG. 19 is a flow chart of a method for interactive response according to an embodiment of the present disclosure.

Reference is made to FIG. 19, which shows a flow chart of a method for interactive response according to another embodiment of the present disclosure. In the embodiment, that the method for interactive response is applied to the user terminal 1710 shown in FIG. 17 is illustrated. The method includes steps 1902 to 1906.

In step 1902, a user client establishes an audio and video call connection with a service client.

In step 1904, the user client obtains display configuration corresponding to the service client.

In step 1906, the user client displays a menu interface, corresponding to a service provided by the service client, on an audio and video call interface based on the display configuration.

Figure 20:
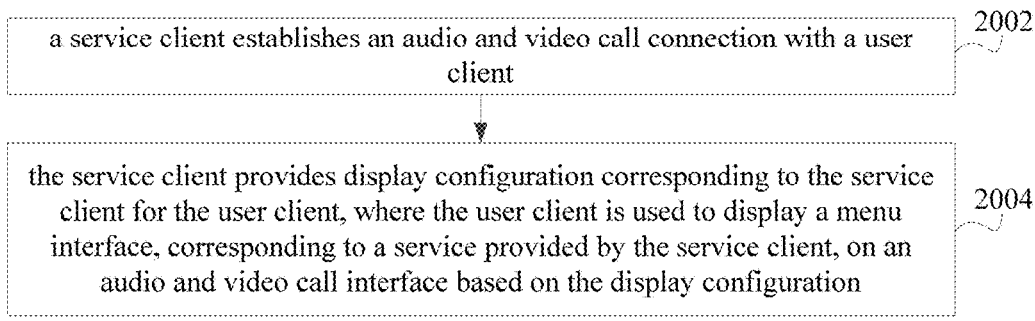
FIG. 20 is a flow chart of a method for interactive response according to an embodiment of the present disclosure.

Reference is made to FIG. 20, which shows a flow chart of a method for interactive response according to another embodiment of the present disclosure. In the embodiment, that the method for interactive response is applied to the service terminal 1730 shown in FIG. 17 is illustrated. The method includes steps 2002 to 2004.

In step 2002, a service client establishes an audio and video call connection with a user client.

In step 2004, the service client provides display configuration corresponding to the service client for the user client. The user client is used to display a menu interface, corresponding to a service provided by the service client, on an audio and video call interface based on the display configuration.

In conclusion, based on the method for interactive response according to the above embodiment, the service client establishes the audio and video call connection with the user client; and the service client provides the display configuration corresponding to the service client for the user client, and the user client is used to display the menu interface, corresponding to the service provided by the service client, on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Figure 21A:
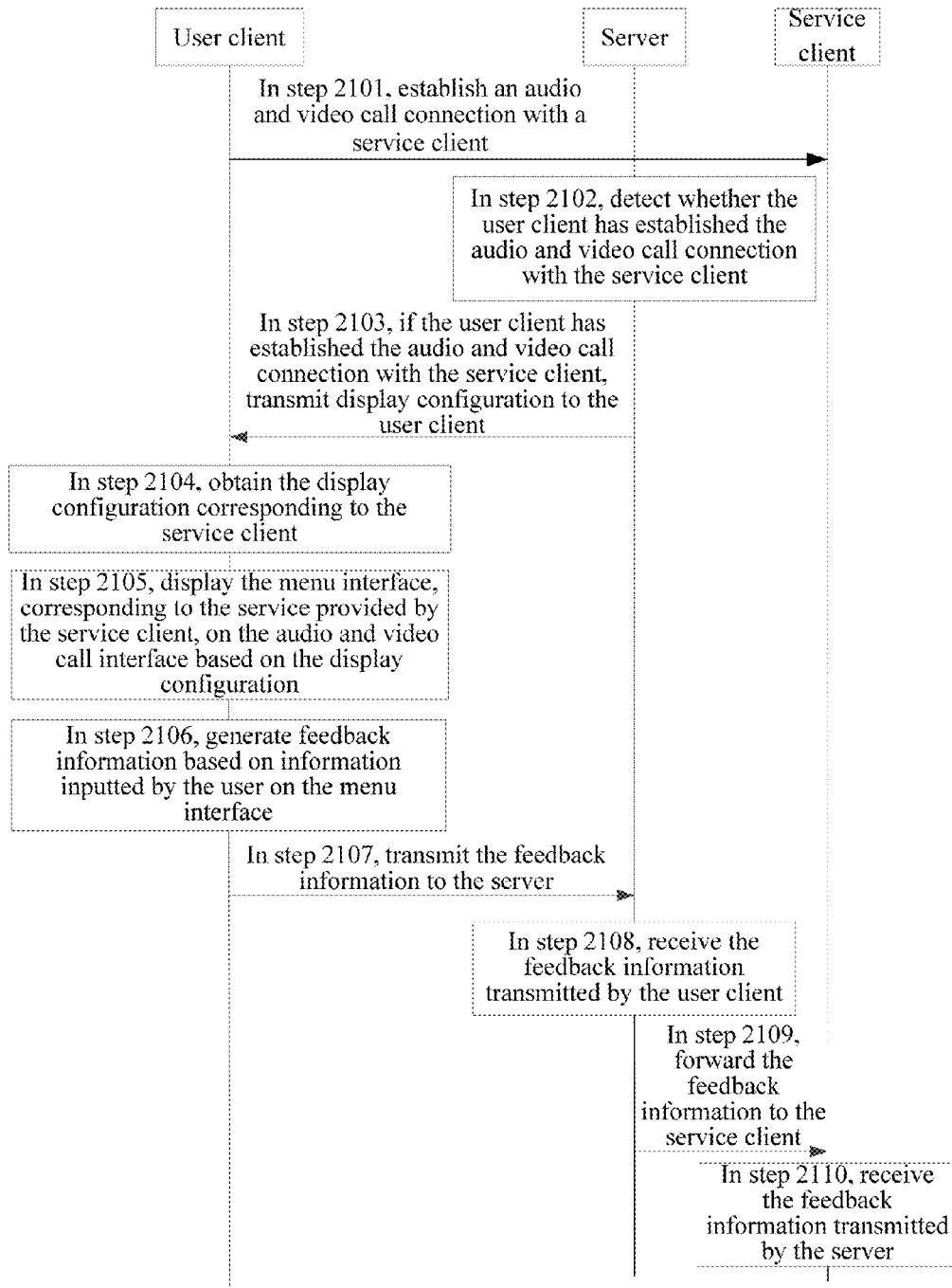
FIG. 21A is a flow chart of a method for interactive response according to an embodiment of the present disclosure.

Reference is made to FIG. 21A, which shows a flow chart of a method for interactive response according to another embodiment of the present disclosure. In the embodiment, that the method for interactive response is applied to the implementation environment shown in FIG. 17 is illustrated. The method includes steps 2101 to 2110.

In step 2101, a user client establishes an audio and video call connection with a service client.

A user transmits a connection request to the service client by inputting an account of the service client in the user client, to request to conduct an audio and video call with the service client. The user client is an instant messaging client or a social application client used by the user. The service client is a client providing services for the user and is an instant messaging client or a social application client used by a service provider. Correspondingly, the account of the service client may be an account of the instant messaging client or the social application client.

The user client may run on an electronic device such as a tablet computer or a mobile phone. The service client may run on an electronic device such as a tablet computer, a portable laptop computer or a desktop computer. In the embodiment, that the user client and the service client each run on a tablet computer is taken as an example for description, and the present disclosure is not limited hereto.

Correspondingly, the service client accepts the connection request after receiving the connection request transmitted by the user client, and establishes the audio and video call connection with the user client.

In step 2102, a server detects whether the user client has established the audio and video call connection with the service client.

For example, when the user client establishes the audio and video call connection with the service client, the user client and the service client will obtains the same session number. In a case that the server detects that the session number of the user client is the same as that of the service client, the user client has established the audio and video call connection with the service client. In a case that the server detects that the session number of the user client is not the same as that of the service client, the user client has not established the audio and video call connection with the service client.

In a case that the user client has established the audio and video call connection with the service client, the step 2103 is performed.

In step 2103, if the user client has established the audio and video call connection with the service client, the server transmits display configuration to the user client.

After the user client establishes the audio and video call connection with the service client, the server transmits the display configuration to the user client. The user client is used to display a menu interface, corresponding to a service provided by the service client, on an audio and video call interface based on the display configuration. The step includes two possible implementations described hereinafter.

In a first possible implementation, the service receives the display configuration transmitted by the service client; and forwards the display configuration to the user client.

After establishing the audio and video call connection with the user client, the service client may transmit the pre-edited display configuration to the server at any instant. The display configuration may be a configuration file which is of an Extensive Markup Language (XML), a Hypertext Markup Language (HTML) or a CONFIG (CONF) format. After receiving the display configuration, the server forwards the display configuration to the user client connected with the service client.

In a second possible implementation, the server receives a request instruction of the user client, forwards the request instruction to the service client, receives the display configuration fed back based on the request instruction by the service client, and forwards the display configuration to the user client.

After the service client establishes the audio and video call connection with the user client, the user transmits the request instruction to the server via the user client, and the server forwards the request instruction to the service client. The request instruction may be a text instruction or a voice instruction input by the user on the user client. After receiving the request instruction transmitted by the server, the service client transmits the display configuration corresponding to the request instruction to the server, and the server forwards the display configuration to the user client.

Figure 21B:
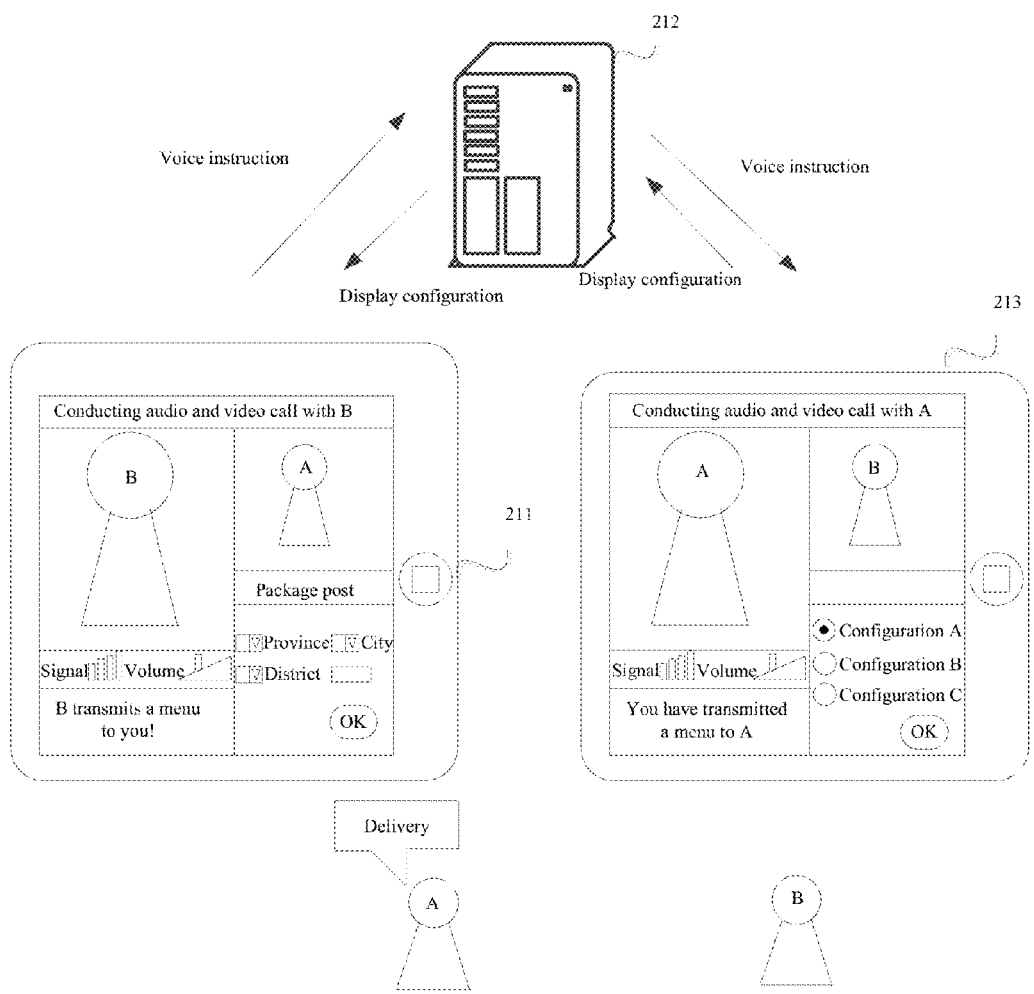
FIG. 21B is a schematic diagram of implementation of a method for interactive response according to an embodiment of the present disclosure.

For example, as shown in FIG. 21B, after receiving a voice instruction "delivery" of a user, a user client 211 transmits the voice instruction to a server 212. The server 212 forwards the voice instruction to a service client 213. The service client 213 transmits display configuration A corresponding to the voice instruction to the user client 211 via the server 212.

In step 2104, the user client obtains the display configuration corresponding to the service client.

The user client receives the display configuration transmitted by the server. The display configuration corresponds to the service client connected with the user client.

In step 2105, the user client displays the menu interface, corresponding to the service provided by the service client, on the audio and video call interface based on the display configuration.

The user client parses the received display configuration, and displays the corresponding menu interface on the audio and video call interface. The menu interface includes at least one element of text, image, video, radio menu, check box menu, pull-down menu, text entry box and password entry box.

Figure 21C:
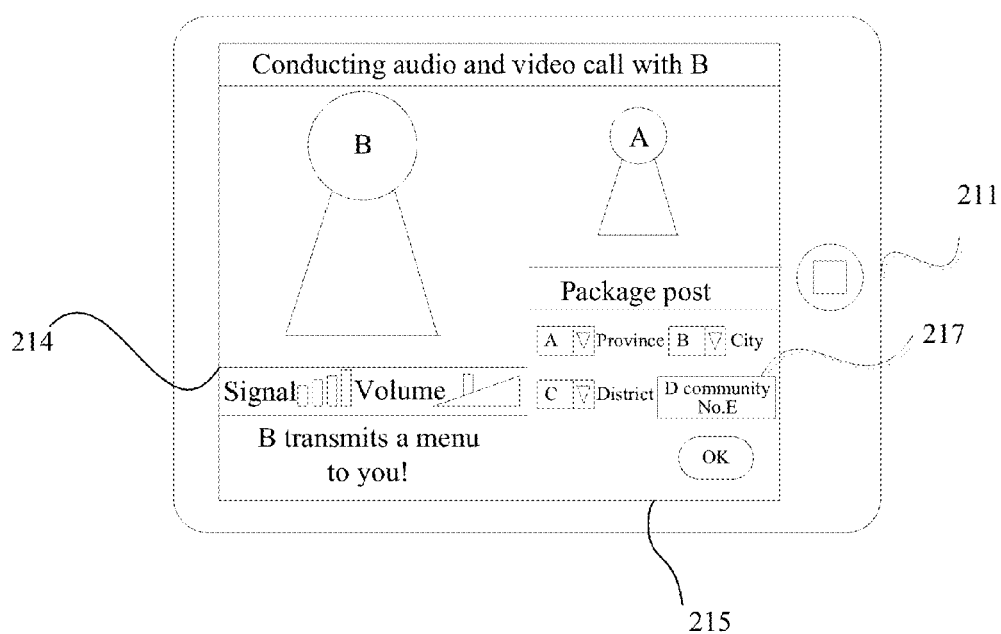
FIG. 21C is a schematic diagram of an interface in a method for interactive response according to an embodiment of the present disclosure.

For example, as shown in FIG. 21C, a user client 211 parses received display configuration which is of an XML format, and displays an address input interface 217 obtained by parsing, on an audio and video call interface 214. A menu interface 215 includes text, pull-down menus and text entry box.

In step 2106, the user client generates feedback information based on information inputted by the user on the menu interface.

The user client obtains the information inputted by the user on the menu interface and generates the feedback information. The inputted information may be selection information or text information of the user.

For example, as shown in FIG. 21C, feedback information generated by the user client based on information inputted by the user may be "A province B city C street D community No. E".

In step 2107, the user client transmits the feedback information to the server. The server is used to forward the feedback information to the service client.

In step 2108, the server receives the feedback information transmitted by the user client.

In step 2109, the service client forwards the feedback information to the service client.

In step 2110, the service client receives the feedback information transmitted by the server.

The service client may transmit new display configuration to the server based on the received feedback information, to achieve the interaction between the user client and the service client. A specific implementation step thereof is similar to the step 503, which is not described herein.

In conclusion, based on the method for interactive response according to the embodiment, it is detected whether the user client has established the audio and video call connection with the service client; and if the user client has established the audio and video call connection with the service client, the display configuration is transmitted to the user client, and the user client is used to display the menu interface, corresponding to the service provided by the service client, on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Furthermore, in the embodiment, the user client generates the feedback information based on the information inputted by the user on the menu interface and forwards the feedback information to the service client via the server, and the service client may transmit new display configuration to the user client based on the feedback information. Hence, an effect that the user client and the service client interact with each other in the audio and video call process is achieved.

In a specific implementation process, the server may receive in advance at least one display configuration and an identification instruction table uploaded by the service client, and store the at least one display configuration and the identification instruction table; and the server receives an identification instruction transmitted by the user client or the service client, searches for display configuration corresponding to the identification instruction based on the identification instruction table, and transmits the display configuration to the user client. An embodiment is provided for illustration hereinafter.

Figure 22A:
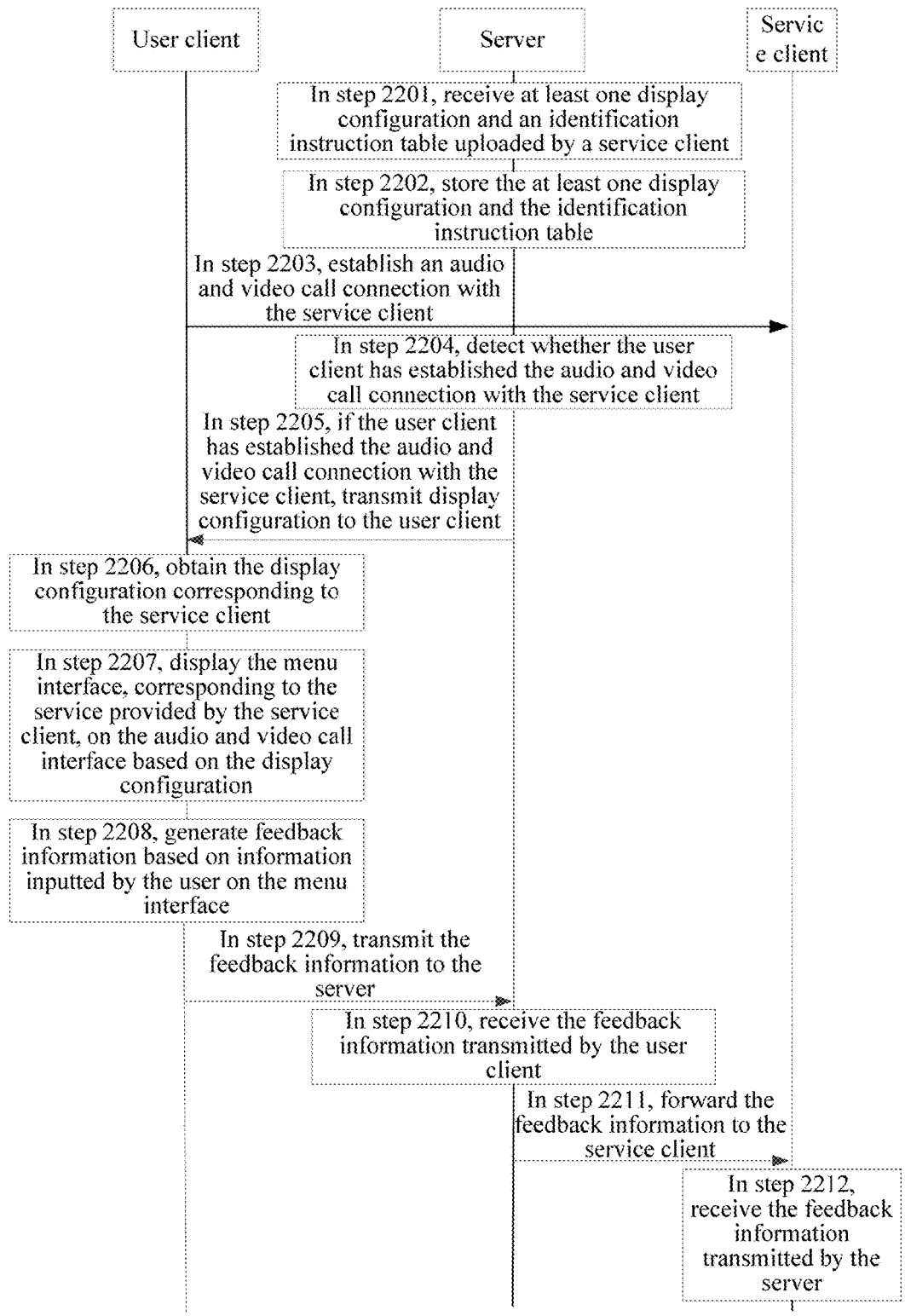
FIG. 22A is a flow chart of a method for interactive response according to an embodiment of the present disclosure.

Reference is made to FIG. 22A, which shows a flow chart of a method for interactive response according to another embodiment of the present disclosure. In the embodiment, the applying the method for interactive response to the implementation environment shown in FIG. 17 is illustrated. The method includes steps 2201 to 2212.

In step 2201, a server receives at least one display configuration and an identification instruction table uploaded by a service client.

The service client pre-uploads the display configuration and the identification instruction table to the server. The identification instruction table includes a correspondence between identification instructions and display configuration. The structure of the identification instruction table may be the structure shown in Table 1.

TABLE 1

| identification instruction | display configuration |
|---|---|
| identification instruction A | display configuration A |
| identification instruction B | display configuration B |
| identification instruction C | display configuration C |

Different display configuration corresponds to different menu interfaces respectively. For example, the display configuration A corresponds to an inquiry interface; the display configuration B corresponds to a delivery interface; and the display configuration C corresponds to an evaluation interface.

In step 2202, the server stores the at least one display configuration and the identification instruction table.

The server stores the received at least one display configuration and the identification instruction table. Different identification instruction tables correspond to service clients respectively.

In step 2203, a user client establishes an audio and video call connection with the service client.

A user transmits a connection request to the service client by inputting an account of the service client in the user client, to request to conduct an audio and video call with the service client. The user client is an instant messaging client or a social application client used by the user. The service client is a client providing services for the user and is an instant messaging client or a social application client used by a service provider. Correspondingly, the account of the service client may be an account of the instant messaging client or the social application client.

The user client may run on an electronic device such as a tablet computer or a mobile phone. The service client may run on an electronic device such as a tablet computer, a portable laptop computer or a desktop computer. In the embodiment, that the user client and the service client each run on a tablet computer is taken as an example for description, and the present disclosure is not limited hereto.

Correspondingly, the service client accepts the connection request after receiving the connection request transmitted by the user client, and establishes the audio and video call connection with the user client.

In step 2204, the server detects whether the user client has established the audio and video call connection with the service client.

For example, when the user client establishes the audio and video call connection with the service client, the user client and the service client will obtain the same session number. In a case that the server detects that the session number of the user client is the same as that of the service client, the user client has established the audio and video call connection with the service client. In a case that the server detects that the session number of the user client is not the same as that of the service client, the user client has not established the audio and video call connection with the service client.

In a case that the user client has established the audio and video call connection with the service client, the step 2205 is performed.

In step 2205, if the user client has established the audio and video call connection with the service client, the server transmits display configuration to the user client.

After the user client establishes the audio and video call connection with the service client, the server will transmit the display configuration to the user client. The user client displays a menu interface, corresponding to a service provided by the service client, on an audio and video call interface based on the display configuration. The step includes three possible implementations described hereinafter.

In a first possible implementation, the server transmits the display configuration to the user client automatically after the user client establishes the connection with the service client.

After detecting that the user client has established the connection with the service client, the server searches a pre-set default configuration table for the display configuration corresponding to the service client, and transmits the display configuration to the user client. The structure of the default configuration table may be the structure shown in Table 2.

TABLE 2

| service client | display configuration |
| --- | --- |
| service client A | display configuration A |
| service client B | display configuration B |
| service client C | display configuration C |

In a second possible implementation, the server receives an identification instruction transmitted by the service client, searches a pre-set identification instruction table for the display configuration corresponding to the identification instruction; and transmits the display configuration to the user client.

After the user client has established the connection with the service client, the service client may transmit the identification instruction to the server at any instant. The identification instruction may be triggered by voice, text or a click button. After receiving the identification instruction transmitted by the service client, the server searches the identification instruction table for the display configuration corresponding to the identification instruction, and transmits the found display configuration to the user client.

Figure 22B:
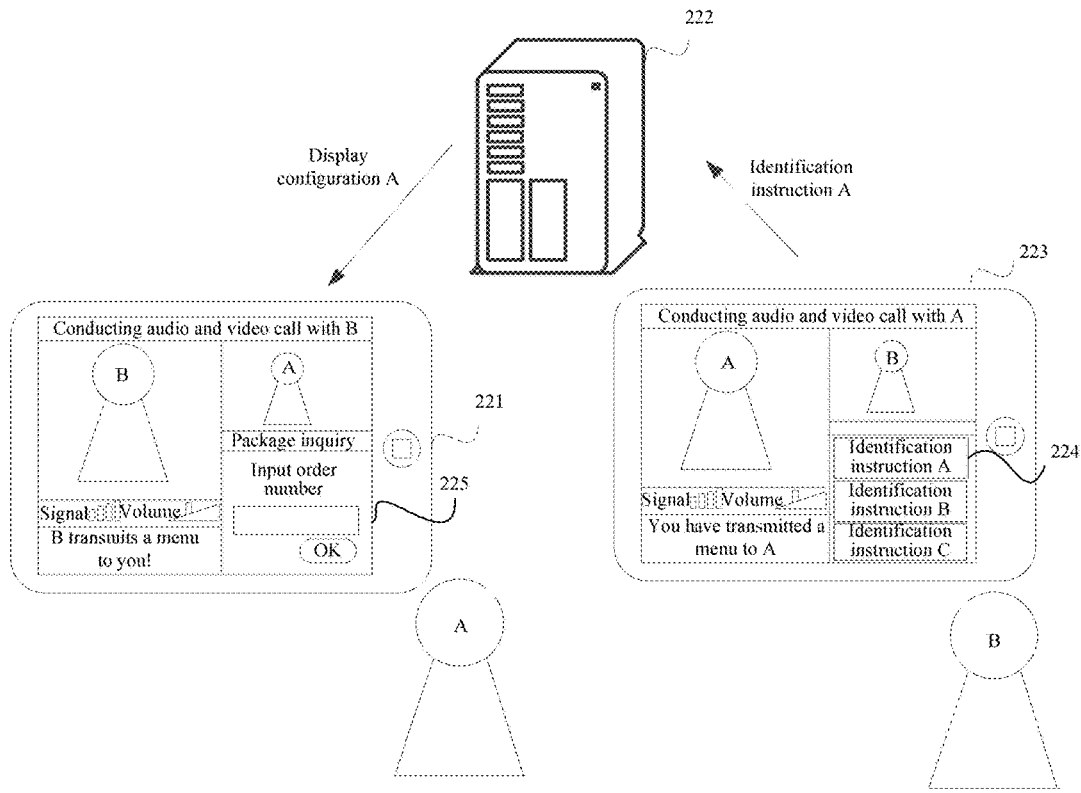
FIGS. 22B to 22D each are a schematic diagram of implementation of a method for interactive response according to an embodiment of the present disclosure.

For example, as shown in FIG. 22B, a service member transmits an identification instruction A to a server 222 by clicking a button 224 on a service client 223. Corresponding display configuration found by the server 222 in an identification instruction table based on the identification instruction A is display configuration A, and the display configuration A is transmitted to a user client 221. The user client 221 displays an inquiry interface 225 corresponding to the display configuration A.

In a third possible implementation, the server receives an identification instruction of the user client; searches for a pre-set identification instruction table for the display configuration corresponding to the identification instruction; and transmits the display configuration to the user client.

After the user client has established the audio and video call connection with the service client, the identification instruction may be transmitted by the user client to the server. The server searches the identification instruction table for the corresponding display configuration based on the identification instruction, and transmits the display configuration to the user client.

Figure 22C:
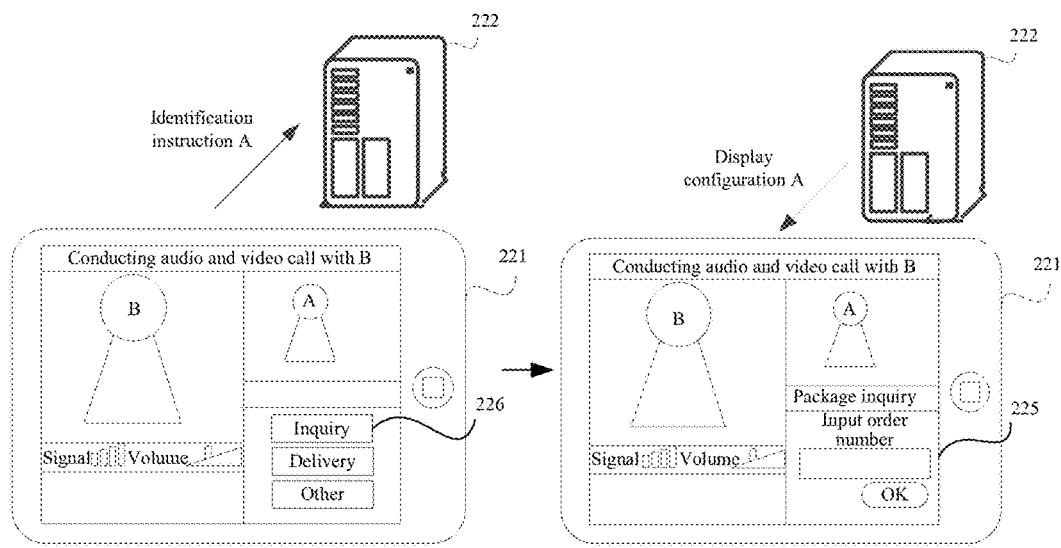

For example, as shown in FIG. 22C, a user transmits an identification instruction A to a server 222 by clicking inquiry 226 on a user client 221. Corresponding display configuration found by the server 222 in an identification instruction table based on the identification instruction A is display configuration A, and the display configuration A is transmitted to the user client 221. The user client 221 displays an inquiry interface 225 corresponding to the display configuration A.

In step 2206, the user client obtains the display configuration corresponding to the service client.

The user client receives the display configuration transmitted by the server. The display configuration corresponds to the service client connected with the user client.

In step 2207, the user client displays the menu interface, corresponding to the service provided by the service client, on the audio and video call interface based on the display configuration.

The user client parses the received display configuration, and displays the corresponding menu interface on the audio and video call interface. The menu interface includes at least one element of text, image, video, radio menu, check box menu, pull-down menu, text entry box and password entry box.

For example, as shown in FIG. 22C, the user client 221 parses received display configuration which is of an XML format, and displays an address input interface 227 obtained by parsing, on an audio and video call interface 224. A menu interface 225 includes text, pull-down menus and text entry box.

In step 2208, the user client generates feedback information based on information inputted by the user on the menu interface.

The user client obtains the information inputted by the user on the menu interface and generates the feedback information. The inputted information may be selection information or text information of the user.

For example, as shown in FIG. 22C, feedback information generated by the user client based on information inputted by the user may be "A province B city C street D community No. E".

In step 2209, the user client transmits the feedback information to the server. The server is used to forward the feedback information to the service client.

In step 2210, the server receives the feedback information transmitted by the user client.

In step 2211, the server forwards the feedback information to the service client.

In step 2212, the service client receives the feedback information transmitted by the server.

The service client may transmit a new identification instruction to the server based on the received feedback information, and the server transmits new display configuration to the user client based on the identification instruction, to achieve the interaction between the user client and the service client. A specific implementation step thereof is similar to the step 2205, which is not described herein.

In conclusion, based on the method for interactive response according to the embodiment, it is detected whether the user client has established the audio and video call connection with the service client; and if the user client has established the audio and video call connection with the service client, the display configuration is transmitted to the user client, and the user client is used to display the menu interface, corresponding to the service provided by the service client, on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Furthermore, in the embodiment, the display configuration and the identification instruction table is pre-stored in the server. The server only needs to search for the corresponding display configuration based on the identification instruction transmitted by the user client or the service client and transmit the display configuration to the user client, thereby improving the operating efficiency of the server.

In a specific implementation scenario, the service client may transmit a video to the user client and interact with the user client in a real-time manner in the process of playing the video.

Figure 22D:
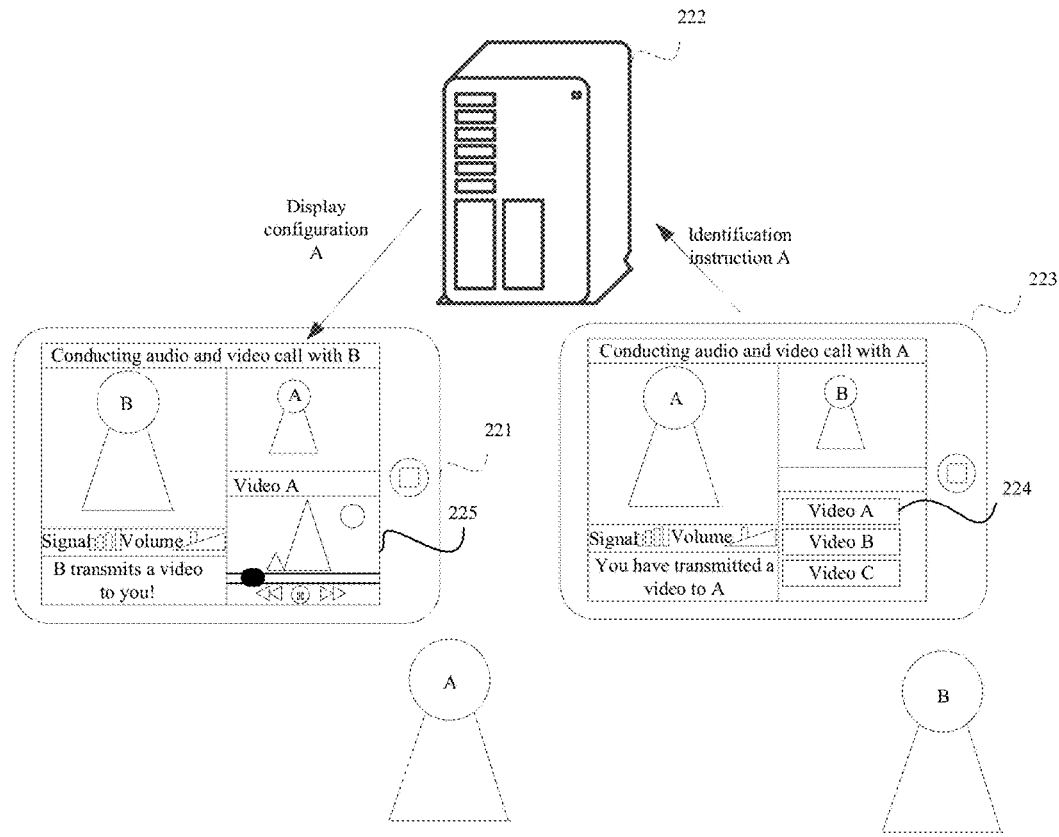

As shown in FIG. 22D, a service client 223 establishes an audio and video call connection with a user client 221. The service client 223 transmits an identification instruction A to a server 222. The server 222 finds corresponding display configuration A in a pre-set identification instruction table based on the identification instruction A. The display configuration A is a video. The server 222 transmits the display configuration A to the user client 221. The user client 221 parses the received display configuration A, and plays the video on a menu interface 225 displayed on an audio and video call interface. Correspondingly, the service client 223 plays the video synchronously. The service client 223 and the user client 222 both can control the play progress of the video, and can communicate with each other via the audio and video call in the process of playing the video.

Figure 23:
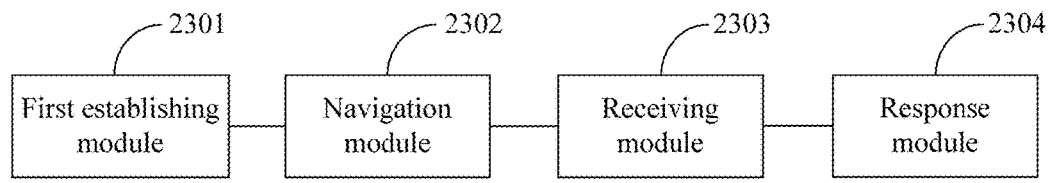
FIG. 23 is a structural block diagram of an apparatus for interactive response according to an embodiment of the present disclosure.

As shown in FIG. 23, an apparatus for interactive response is provided according another embodiment of the present disclosure, which includes:

a first establishing module 2301, configured to establish a call supporting text transmission, with a user terminal, after a call request is initiated by the user terminal;

a navigation module 2302, configured to transmit text content of each option on a navigation menu to the user terminal;

a receiving module 2303, configured to receive an option selected by a user on the navigation menu based on the text content, transmitted by the user terminal; and a response module 2304, configured to execute a corresponding response based on the option.

In the embodiment, optionally, the first establishing module 2301 may be configured to: receive a call request, transmitted by a gateway after the user terminal is triggered, establish a session initiation protocol SIP call, which supports text transmission, with the gateway, and return a call response message by the gateway to the user terminal.

In the embodiment, optionally, the navigation module 2302 may include: a navigation unit, configured to transmit an INFO message to a gateway, and forward by the gateway the text content of the each option on the navigation menu to the user terminal, where a content-type field in a message header of the INFO message is information about a data exchange format, and a message body of the INFO message includes the text content of the each option on the navigation menu which is edited in the data exchange format.

In the embodiment, optionally, the first establishing module 2301 may includes:

a first receiving unit, configured to receive an SIP invite message, transmitted by the gateway after the call request is initiated by the user terminal, where a header field of the SIP invite message carries information about a data exchange format supported by the user terminal; and a first establishing unit, configured to return an SIP response message to the gateway, and establish the SIP call, which supports text transmission, with the gateway, after determining that the data exchange format is supported by the apparatus.

In the embodiment, optionally, the response module 2304 may include:

a first transmitting unit, configured to transmit text content on a sub-menu corresponding to the option to the user terminal;

a second receiving unit, configured to receive text information input by the user on the sub-menu transmitted by the user terminal; and a processing unit, configured to execute corresponding processing based on the text information input by the user.

The above apparatus according to the embodiment may be applied to a CC. A conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

Figure 24:
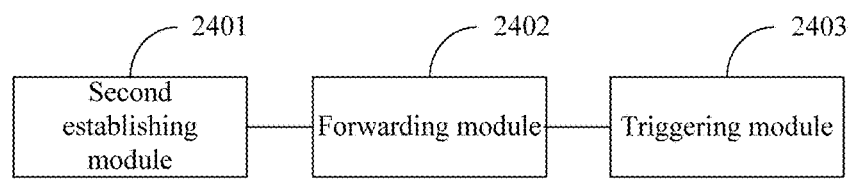
FIG. 24 is a structural block diagram of an apparatus for interactive response according to an embodiment of the present disclosure.

As shown in FIG. 24, an apparatus for interactive response is provided according to another embodiment of the present disclosure, which includes:

a second establishing module 2401, configured to establish an SIP call supporting text transmission, with a call center CC, after a request of a user terminal is received;

a forwarding module 2402, configured to forward text content of each option on a navigation menu, which is transmitted by the CC, to the user terminal; and a triggering module 2403, configured to forward an option selected by a user on the navigation menu based on the text content and is transmitted by the user terminal, to the CC, to trigger the CC to execute a corresponding response based on the option.

In the embodiment, optionally, the forwarding module 2402 may include:

a third receiving unit, configured to receive an INFO message transmitted by the CC;

a determining unit, configured to read information about a data exchange format from a content-type field in a message header of the INFO message, and determine that the currently transmitted content is of the data exchange format; and a first forwarding unit, configured to read the text content of the each option on the navigation menu from a message body of the INFO message, and forward the text content to the user terminal.

In the embodiment, optionally, the second establishing module 2401 may include:

a requesting unit, configured to transmit an SIP invite message to the CC after receiving the request of the user terminal, where a header field of the SIP invite message carries information about a data exchange format supported by the user terminal; and a second establishing unit, configured to receive an SIP response message returned by the CC, complete an establishment of the SIP call, which supports text transmission, with the CC, and return a call response message to the user terminal.

In the embodiment, optionally, the forwarding module 2402 may be further configured to: transmit text content on a sub-menu corresponding to the option which is transmitted by the CC to the user terminal; and the triggering module 2403 may be further configured to: forward text information input by the user on the sub-menu which is transmitted by the user terminal, to the CC, and trigger the CC to execute corresponding processing.

The above apparatus according to the embodiment may be applied to a gateway. A conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

Figure 25:
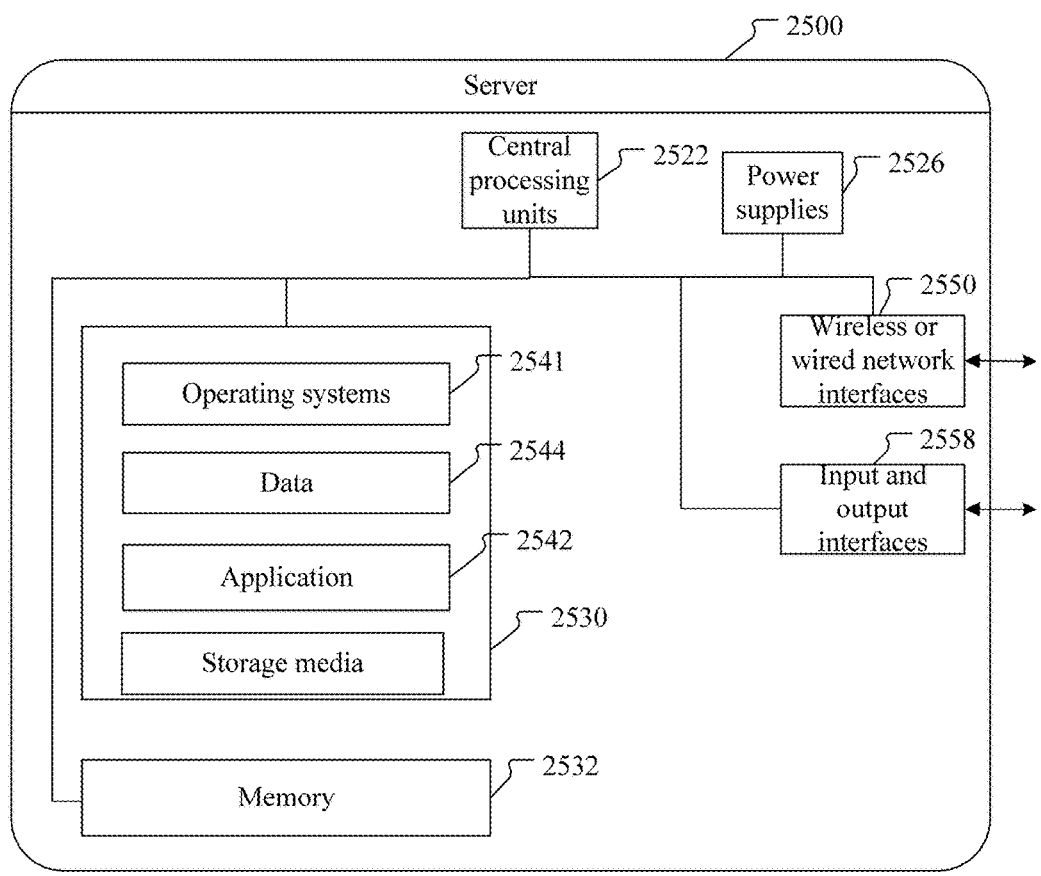
FIG. 25 is a structural diagram of a server according to an embodiment of the present disclosure.

A server is provided according to another embodiment of the present disclosure, which may be configured to implement a method for interactive response according to the above embodiments. As shown in FIG. 25, the server 2500 may change greatly due to different configuration or performance, and may include one or more central processing units (CPU) 2522 (such as one or more processors), a memory 2532, and one or more storage media 2530 (such as one or more mass storage devices) for storing an application 2542 or data 2544. The memory 2532 and the storage media 2530 may be volatile or permanent. A program stored in the storage media 2530 may include one or more modules (which are not shown in the figure), and each module may include a series of instruction operations in the server. Furthermore, the central processing units 2522 may be configured to communicate with the storage media 2530, and execute the series of instruction operations stored in the storage media 2530 on the server 2500.

The server 2500 may further include one or more power supplies 2526, one or more wired or wireless network interfaces 2550, one or more input and output interfaces 2558 and/or one or more operating systems 2541, such as Windows Server™, Mac OS X™, Unix™, Linux™, FreeBSD™.

Specifically, in the embodiment, one or more processors are configured to execute the one or more programs including instructions for performing the following operations:

establishing a call, which supports text transmission, with a user terminal, after a call request is initiated by the user terminal;

transmitting text content of each option on a navigation menu to the user terminal;

receiving an option, which is selected by a user on the navigation menu based on the text content, transmitted by the user terminal; and executing a corresponding response based on the option.

The establishing a call, which supports text transmission, with a user terminal after a call request is initiated by the user terminal includes: receiving a call request, transmitted by a gateway after the user terminal is triggered, establishing a session initiation protocol SIP call, which supports text transmission, with the gateway, and returning a call response message by the gateway to the user terminal.

The transmitting text content of each option on a navigation menu to the user terminal includes: transmitting an INFO message to a gateway, and forwarding by the gateway the text content of the each option on the navigation menu to the user terminal, where a content-type field in a message header of the INFO message is information about a data exchange format, and a message body of the INFO message includes the text content of the each option on the navigation menu which is edited in the data exchange format.

The receiving a call request, transmitted by a gateway after the user terminal is triggered, establishing a session initiation protocol SIP call, which supports text transmission, with the gateway includes:

receiving an SIP invite message, transmitted by the gateway after the call request is initiated by the user terminal, where a header field of the SIP invite message carries information about a data exchange format supported by the user terminal; and after determining the data exchange format is supported by itself, returning an SIP response message to the gateway, and establishing the SIP call, which supports text transmission, with the gateway.

The executing a corresponding response based on the option includes:

transmitting text content on a sub-menu corresponding to the option to the user terminal;

receiving text information input by the user on the sub-menu which is transmitted by the user terminal; and executing corresponding processing based on the text information input by the user.

The data exchange format is JavaScript Object Notation JSON or Extensive Markup Language XML.

Based on the above server according to the embodiment, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

A server is provided according to another embodiment of the present disclosure, which may be configured to implement a method for interactive response according to the above embodiments. The structure of the server is shown in FIG. 25.

Specifically, in the embodiment, one or more processors are configured to execute one or more programs including instructions for performing the following operations:

establishing a session initiation protocol SIP call, which supports text transmission, with a call center CC, after a request of a user terminal is received.

forwarding text content of each option on a navigation menu, which is transmitted by the CC, to the user terminal.

forwarding an option, which is selected by a user on the navigation menu based on the text content and is transmitted by the user terminal, to the CC, to trigger the CC to execute a corresponding response based on the option.

The forwarding text content of each option on a navigation menu, which is transmitted by the CC, to the user terminal includes:

receiving an INFO message transmitted by the CC;

reading information about a data exchange format from a content-type field in a message header of the INFO message, and determining that the currently transmitted content is of the data exchange format; and reading the text content of the each option on the navigation menu from a message body of the INFO message, and forwarding the text content to the user terminal.

The establishing a session initiation protocol SIP call, which supports text transmission, with a call center CC, after a request of a user terminal is received includes:

after receiving the request of the user terminal, transmitting an SIP invite message to the CC, where a header field of the SIP invite message carries information about a data exchange format supported by the user terminal; and receiving an SIP response message returned by the CC, completing an establishment of an SIP call, which supports text transmission, with the CC, and returning a call response message to the user terminal.

The server is further configured to perform:

transmitting text content on a sub-menu corresponding to the option which is transmitted by the CC to the user terminal; and forwarding text information input by the user on the sub-menu which is transmitted by the user terminal, to the CC, and triggering the CC to execute corresponding processing.

The data exchange format is JavaScript Object Notation JSON or Extensive Markup Language XML.

Based on the above server according to the embodiment, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

A non-volatile readable storage medium is provided according to another embodiment of the present disclosure, storing one more modules (programs) such that instructions of steps in the above method embodiments are executed by a device when the one or more modules are applied to the device.

Figure 26:
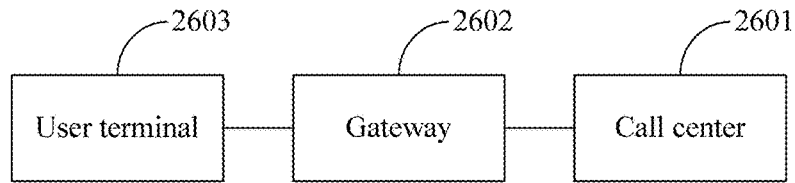
FIG. 26 is a structural diagram of a system for interactive response according to an embodiment of the present disclosure.

As shown in FIG. 26, a system for interactive response is provided according to another embodiment of the present disclosure, which includes: a call center 2601, a gateway 2602 and a user terminal 2603. The call center may be an apparatus for interactive response shown in FIG. 23. The gateway may be an apparatus for interactive response shown in FIG. 24. For specific functions, reference is made to the descriptions in the above embodiments, which are not described herein.

Based on the above system according to the embodiment, a conventional digital IVR navigation menu can be upgraded to a visual menu, which can display both numbers and words and enable a user to intuitively view corresponding options without the need for listening to a voice broadcast. Therefore, a disadvantage of digital display that the interactive manner is too simple is overcome, text can be displayed in the interaction, and the interactive ability is greatly improved.

Figure 27:
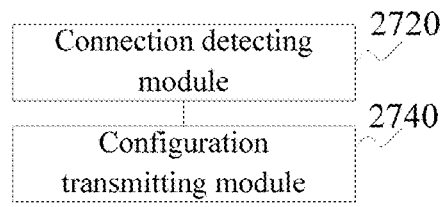
FIG. 27 is a structural block diagram of an apparatus for interactive response according to an embodiment of the present disclosure.

Reference is made to FIG. 27, which shows a structural block diagram of an apparatus for interactive response according to an embodiment of the present disclosure. The apparatus for interactive response may be implemented as all or a part of a server by software, hardware or a combination thereof. The apparatus for interactive response includes:

a connection detecting module 2720, configured to detect whether an audio and video call connection has been established between a user client and a service client; and a configuration transmitting module 2740, configure to transmit display configuration to the user client, if the audio and video call connection has been established between the user client and the service client, where the user client is used to display a menu interface, corresponding to a service provided by the service client, on an audio and video call interface based on the display configuration.

In conclusion, based on the apparatus for interactive response, it is detected whether the audio and video call connection has been establishes between the user client and the service client; and if the audio and video call connection has been established between the user client and the service client, the display configuration is transmitted to the user client, where the user client is used to display the menu interface, corresponding to the service provided by the service client, on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Figure 28:
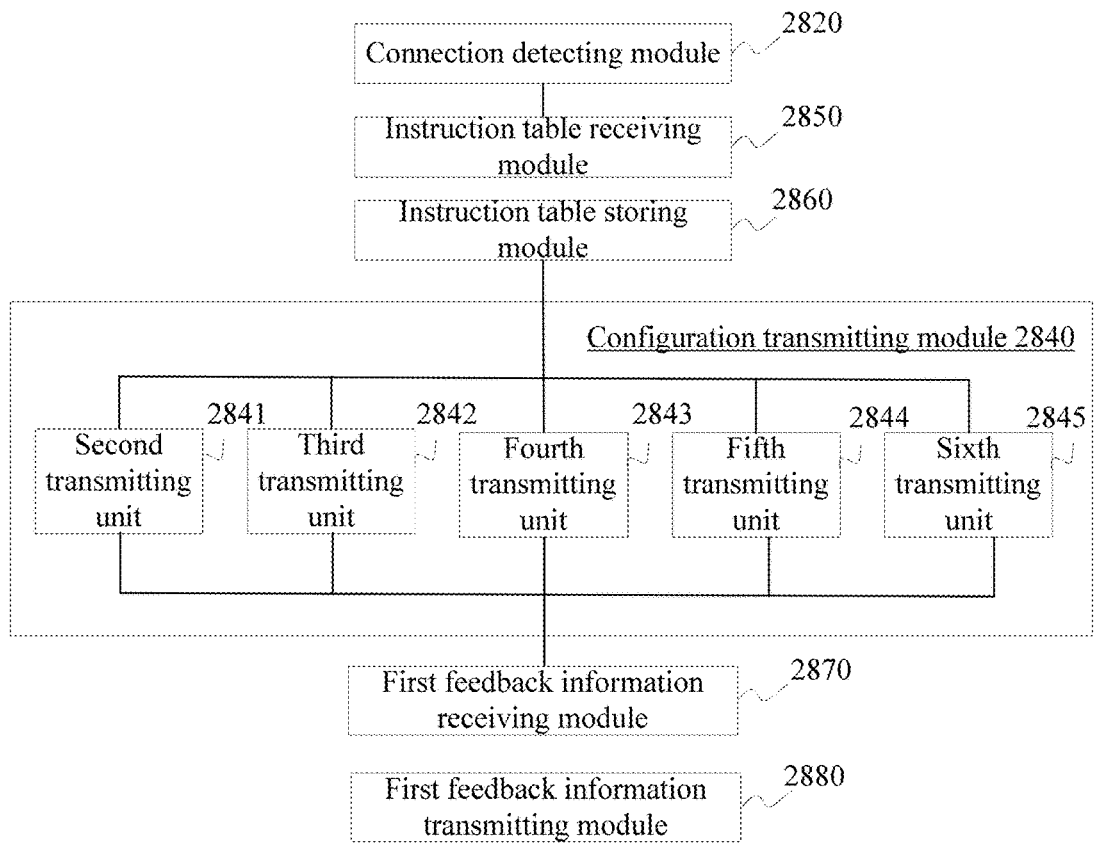
FIG. 28 is a structural block diagram of an apparatus for interactive response according to an embodiment of the present disclosure.

Reference is made to FIG. 28, which shows a structural block diagram of an apparatus for interactive response according to another embodiment of the present disclosure. The apparatus for interactive response may be implemented as all or a part of a server by software, hardware or a combination thereof. The apparatus for interactive response includes:

a connection detecting module 2820, configured to determine whether an audio and video call connection has been established between a user client and a service client; and a configuration transmitting module 2840, configure to transmit display configuration to the user client, if the audio and video call connection has been established between the user client and the service client, where the user client is used to display a menu interface, corresponding to a service provided by the service client, on an audio and video call interface based on the display configuration.

In an embodiment, the configuration transmitting module 2840 includes:

a second transmitting unit 2841, configured to receive the display configuration transmitted by the service client; and forward the display configuration to the user client; and/or a third transmitting unit 2842, configured to receive a request instruction of the user client; forward the request instruction to the service client; receive the display configuration fed back based on the request instruction by the service client; and forward the display configuration to the user client.

In an embodiment, the configuration transmitting module 2840 includes:

a fourth transmitting unit 2843, configured to receive an identification instruction transmitted by the service client; search a pre-set identification instruction table for the display configuration corresponding to the identification instruction, where the identification instruction table includes a correspondence between the identification instruction and the display configuration, and different display configuration corresponds to different menu interfaces; and transmit the display configuration to the user client; and/or a fifth transmitting unit 2844, configured to transmit the display configuration to the user client automatically after the user client establishes the connection with the service client; and/or a sixth transmitting unit 2845, configured to receive an identification instruction of the user client; search for a pre-set identification instruction table for the display configuration corresponding to the identification instruction, where the identification instruction table includes a correspondence between the identification instruction and the display configuration, and different display configuration corresponds to different menu interfaces; and transmit the display configuration to the user client.

In an embodiment, the apparatus further includes:

an instruction table receiving module 2850, configured to receive at least one display configuration and the identification instruction table uploaded by the service client; and an instruction table storing module 2860, configured to store the at least one display configuration and the identification instruction table.

In an embodiment, the apparatus further includes:

a first feedback information receiving module 2870, configured to receive feedback information transmitted by the user client, where the feedback information is generated by the user client based on information inputted by a user on the menu interface; and a first feedback information transmitting module 2880, configured to forward the feedback information to the service client.

In an embodiment, the display configuration is a configuration file which is of an XML, HTML or CONF format.

The menu interface includes at least one element of text, image, video, radio menu, check box menu, pull-down menu, text entry box and password entry box.

In an embodiment, the user client is an instant messaging client or a social application client used by a user; and the service client is an instant messaging client or a social application client used by a service provider.

In conclusion, based on the apparatus for interactive response according to the embodiment, it is detected whether the user client has established the audio and video call connection with the service client; and if the user client has established the audio and video call connection with the service client, the display configuration is transmitted to the user client, and the user client is used to display the menu interface, corresponding to the service provided by the service client, on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Furthermore, in the embodiment, the user client generates the feedback information based on the information inputted by the user on the menu interface and forwards the feedback information to the service client via a server, and the service client may transmit new display configuration to the user client based on the feedback information. Hence, an effect that the user client and the service client interact with each other in the audio and video call process is achieved Furthermore, in the embodiment, the display configuration and the identification instruction table is pre-stored in the server. The server only needs to search for the corresponding display configuration based on the identification instruction transmitted by the user client or the service client and transmit the display configuration to the user client, thereby improving the operating efficiency of the server.

Figure 29:
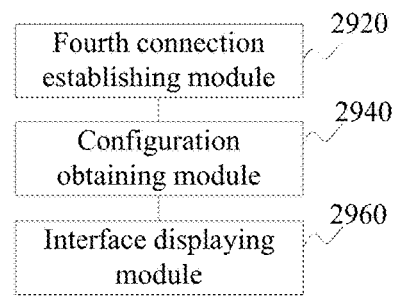
FIG. 29 is a structural block diagram of an apparatus for interactive response according to an embodiment of the present disclosure.

Reference is made to FIG. 29, which shows a structural block diagram of an apparatus for interactive response according to another embodiment of the present disclosure. The apparatus for interactive response may be implemented as all or a part of a user client by software, hardware or a combination thereof. The apparatus for interactive response includes:

a fourth connection establishing module 2920, configured to establish by a user client an audio and video call connection with a service client;

a configuration obtaining module 2940, configured to obtain by the user client display configuration corresponding to the service client; and an interface displaying module 2960, configured to display by the user client a menu interface, corresponding to a service provided by the service client, on an audio and video call interface based on the display configuration.

In conclusion, based on the apparatus for interactive response according to the embodiment, the audio and video call connection is established with the service client; the display configuration corresponding to the service client is obtained; and the menu interface, corresponding to the service provided by the service client, is displayed on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Figure 30:
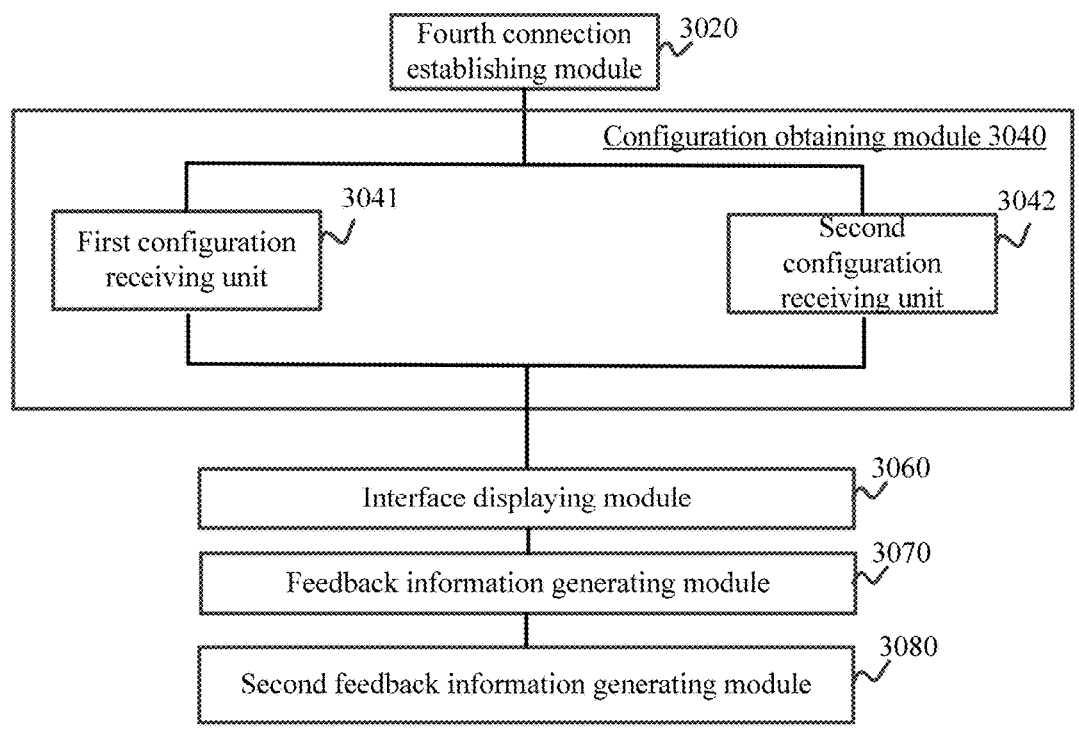
FIG. 30 is a structural block diagram of an apparatus for interactive response according to an embodiment of the present disclosure.

Reference is made to FIG. 30, which shows a structural block diagram of an apparatus for interactive response according to another embodiment of the present disclosure. The apparatus for interactive response may be implemented as all or a part of a user client by software, hardware or a combination thereof. The apparatus for interactive response includes:

a fourth connection establishing module 3020, configured to establish by a user client an audio and video call connection with a service client;

a configuration obtaining module 3040, configured to obtain by the user client display configuration corresponding to the service client; and an interface displaying module 3060, configured to display by the user client a menu interface, corresponding to a service provided by the service client, on an audio and video call interface based on the display configuration.

In an embodiment, the configuration obtaining module 3040 includes:

a first configuration receiving unit 3041, configured to receive by the user client the display configuration transmitted by a server, where the display configuration is transmitted by the service client to the server, or, the display configuration is transmitted by the server, after selecting the display configuration corresponding to an identification instruction from display configuration stored in the server based on the identification instruction transmitted by the service client; or a second configuration receiving unit 3041, configured to transmit by the user client an identification instruction to the server; and receive the display configuration fed back based on the identification instruction by the server.

In an embodiment, the display configuration is a configuration file which is of an XML, HTML or CONF format.

The menu interface includes at least one element of text, image, video, radio menu, check box menu, pull-down menu, text entry box and password entry box.

In an embodiment, the apparatus further includes:

a first feedback information generating module 3070, configured to generate by the user client feedback information based on information inputted by a user on the menu interface; and a second feedback information generating module 3080, configured to transmit by the user client the feedback information to the server, where the server is used to forward the feedback information to the service client.

In conclusion, based on the apparatus for interactive response according to the embodiment, the audio and video call connection is established with the service client; the display configuration corresponding to the service client is obtained; and the menu interface, corresponding to the service provided by the service client, is displayed on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Figure 31:
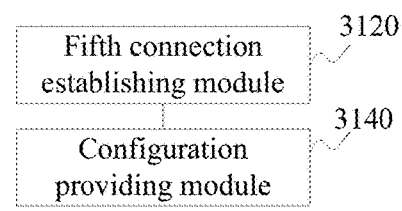
FIG. 31 is a structural block diagram of an apparatus for interactive response according to an embodiment of the present disclosure.

Reference is made to FIG. 31, which shows a structural block diagram of an apparatus for interactive response according to another embodiment of the present disclosure. The apparatus for interactive response may be implemented as all or a part of a service client by software, hardware or a combination thereof. The apparatus for interactive response includes:

a fifth connection establishing module 3120, configured to establish by a service client an audio and video call connection with a user client; and a configuration providing module 3140, configured to provide by the service client display configuration corresponding to the service client for the user client, where the user client is used to display a menu interface, corresponding to a service provided by the service client, on an audio and video call interface based on the display configuration.

In conclusion, based on the apparatus for interactive response according to the embodiment, the service client establishes the audio and video call connection with the user client; and the service client provides the display configuration corresponding to the service client for the user client, and the user client is used to display the menu interface, corresponding to the service provided by the service client, on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

Figure 32:
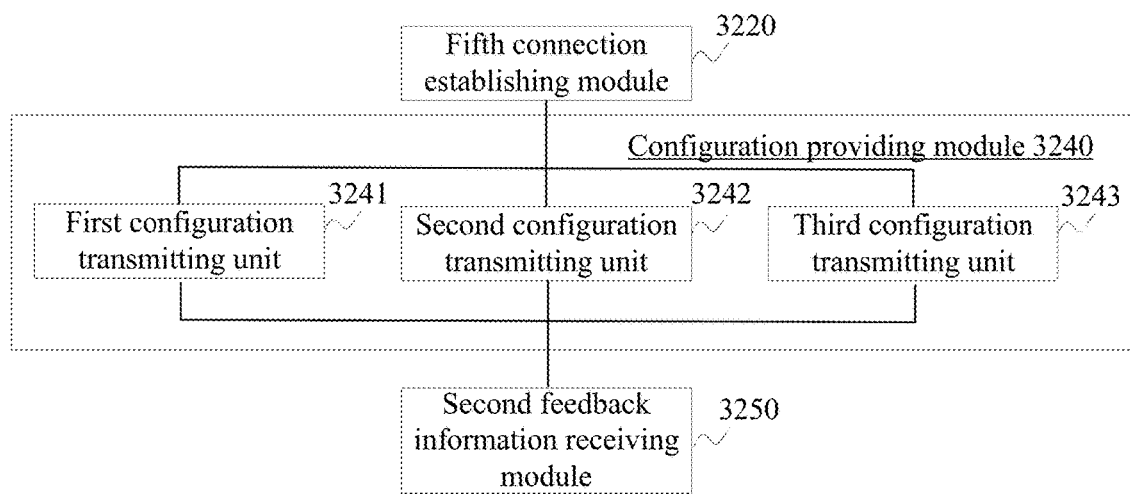
FIG. 32 is a structural block diagram of an apparatus for interactive response according to an embodiment of the present disclosure.

Reference is made to FIG. 32, which shows a structural block diagram of an apparatus for interactive response according to another embodiment of the present disclosure. The apparatus for interactive response may be implemented as all or a part of a service client by software, hardware or a combination thereof. The apparatus for interactive response includes:

a fifth connection establishing module 3220, configured to establish by a service client an audio and video call connection with a user client; and a configuration providing module 3240, configured to provide by the service client display configuration corresponding to the service client for the user client, where the user client is used to display a menu interface, corresponding to a service provided by the service client, on an audio and video call interface based on the display configuration.

In an embodiment, the configuration providing module 3240 includes:

a first configuration transmitting unit 3241, configured to transmit by the service client the display configuration to a server, where the server is used to transmit the display configuration to the user client; or a second configuration transmitting unit 3242, configured to transmit by the service client an identification instruction to the server, where the server is used to search a pre-set identification instruction table for the display configuration corresponding to the identification instruction based on the identification instruction, and transmit the display configuration to the user client; and the identification instruction table includes a correspondence between the identification instruction and the display configuration, and different display configuration corresponds to different menu interfaces; or a third configuration transmitting unit 3243, configured to receive by the service client a request instruction transmitted by the server, where the request instruction is transmitted by the user client to the server; and transmit by the service client the fed back display configuration to the server based on the request instruction, where the server is used to forward the display configuration to the user client.

In an embodiment, the display configuration is a configuration file which is of an XML, HTML or CONF format.

The menu interface includes at least one element of text, image, video, radio menu, check box menu, pull-down menu, text entry box and password entry box.

In an embodiment, the apparatus further includes: a second feedback information receiving module 3250, configured to receive feedback information transmitted by the server, where the feedback information is generated based on information inputted by a user on the menu interface and is transmitted to the server, by the user client.

In conclusion, based on the apparatus for interactive response according to the embodiment, the service client establishes the audio and video call connection with the user client; and the service client provides the display configuration corresponding to the service client for the user client, and the user client is used to display the menu interface, corresponding to the service provided by the service client, on the audio and video call interface based on the display configuration. In this way, a problem that a user has to finish listening to voice before determining a number corresponding to a target service in a case of multiple types of services and application scope is limited due to the single input manner of the user is solved. And an effect that the user can intuitively obtain information from a menu interface in an audio and video call process, which improves the speed and accuracy of obtaining information for the user, is achieved.

It should be noted that, the apparatus for interactive response according to the above embodiments is illustrated merely in a sense of dividing various functional modules; in practical applications, the above functions may be assigned to different functional modules as actually required; that is, the internal structure of the user terminal, network device or service terminal client may be divided into different functional modules so as to implement all or some of the functions described above. In addition, the apparatus for interactive response and the method for audio and video call according to the above embodiments belong to the same concept. For more details of the implementation, please refer to the method embodiments, which are not described herein.

The invention claimed is:

1. A method for interactive response applied to a service terminal, comprising:
   transmitting, by the service terminal, display configuration corresponding to a service client on the service terminal to a user terminal connected with the service terminal; and
   receiving, by the service terminal, feedback information transmitted by the user terminal, wherein the feedback information is generated based on an input operation of a user on an interactive interface constructed based on the display configuration,
   wherein the service terminal establishes a connection with the user terminal by:
   receiving a call request of a network device, after the user terminal initiating the call request; and
   establishing call supporting text transmission based on session initiating protocol (SIP), with the network device, to return a call response message to the user terminal via the network device;
   wherein after the receiving, by the service terminal, feedback information transmitted by the user terminal, the method further comprises:
   transmitting, by the service terminal, a text content on a sub-menu corresponding to the feedback information to the user terminal; and
   receiving, by the service terminal, text information transmitted by the user terminal via an INFO message, wherein the text information is input by the user in the sub-menu.

2. The method according to claim 1, wherein the transmitting, by the service terminal, display configuration corresponding to the service client on the service terminal to the user terminal comprises:
   transmitting, by the service terminal, the display configuration to the network device, to transmit the display configuration to the user terminal; or
   transmitting, by the service terminal, an identification instruction for determining the display configuration to the network device, to transmit the display configuration to the user terminal, wherein the display configuration is determined by the network device by finding the display configuration corresponding to the identification instruction in a pre-set identification instruction table, the pre-set identification instruction table comprises a correspondence between the identification instruction and the display configuration, and different display configuration corresponds to different interactive interface; or
   receiving, by the service terminal, a request instruction transmitted by the network device, wherein the request instruction is transmitted by the user terminal to the network device; transmitting, by the service terminal, the fed back display configuration to the network device based on the request instruction, to forward the display configuration to the user terminal.

3. The method according to claim 1, wherein the connection with the user terminal is a video call connection; the interactive interface is a video call interface, and the video call interface comprises a menu interface corresponding to a service provided by the service client.

4. The method according to claim 1, wherein the display configuration is text content of a navigation menu; and the interactive interface is the navigation menu.

5. The method according to claim 4, wherein the transmitting, by the service terminal, display configuration corresponding to the service client on the service terminal to the user terminal comprises:
   transmitting, by the service terminal, the INFO message to the network device, to forward the text content of each option on the navigation menu to the user terminal, wherein a content-type field in a message header of the INFO message is information about a data exchange format, and a message body of the INFO message comprises the text content of each option on the navigation menu which is edited in the data exchange format.

6. The method according to claim 1, wherein the after the user terminal initiating the call request, receiving, by the service terminal, the call request of the network device comprises:
   receiving, by the service terminal, an SIP invite message, transmitted by the network device after the call request is initiated by the service terminal, wherein a header field of the SIP invite message carries information about a data exchange format supported by the service terminal; and
   the establishing, by the service terminal, a call supporting text transmission based on SIP, with the network device comprises:
   after determining that the data exchange format is supported by the service terminal, returning, by the service terminal, an SIP response message to the network device, and establishing, by the service terminal, the call, which supports text transmission, with the network device.

7. A method for interactive response applied to a user terminal, comprising:
   transmitting, by the user terminal, a call request to a service terminal;
   displaying, by the user terminal, an interactive interface based on received display configuration, wherein the display configuration corresponds to a service client on the service terminal connected with the user terminal, and the interactive interface comprises text information and voice information;
   obtaining, by the user terminal, an input operation of a user on the interactive interface; and
   transmitting, by the user terminal, feedback information based on the input operation to the service terminal;
   wherein, after the transmitting, by the user terminal, feedback information based on the input operation to the service terminal, the method further comprises:
   displaying, by the user terminal, a sub-menu corresponding to the feedback information;
   obtaining, by the user terminal, text information input by the user in the sub-menu; and
   transmitting, by the user terminal, the text information to the service terminal via an INFO message.

8. The method according to claim 7, wherein the user terminal establishes a connection with the service terminal by receiving a call response message returned by a network device after a call supporting text transmission is established between the network device and the service terminal based on SIP.

9. The method according to claim 8, wherein the display configuration is transmitted to the user terminal by the network device, wherein the display configuration is transmitted by the service terminal to the network device, or the display configuration is display configuration corresponding to an identification instruction selected by the network device, based on the identification instruction transmitted by the service terminal, from display configuration stored in the network device.

10. The method according to claim 8, wherein the user terminal receives the display configuration by:
   transmitting an identification instruction to the network device; and
   receiving the display configuration fed back based on the identification instruction by the network device.

11. The method according to claim 8, wherein the connection with the service terminal is a video call connection; the interactive interface is a video call interface, and the video call interface comprises a menu interface corresponding to a service provided by the service client.

12. The method according to claim 7, wherein the display configuration is text content of a navigation menu; and the interactive interface is the navigation menu.

13. A user terminal, comprising:
   a processor and a memory storing one or more programs, the one or more programs comprising instructions, when executed by the processor, cause the processor to:
      construct an interactive interface based on received display configuration, wherein the display configuration corresponds to a service client on a service terminal connected with the user terminal, and the interactive interface comprises text information and voice information;
      display the interactive interface on the user terminal;
      obtain an input operation of a user on the interactive interface;
      generate feedback information based on the input operation;
      transmit the feedback information to the service terminal;
      display a sub-menu corresponding to the feedback information;
      obtain text information input by the user to the sub-menu; and
      transmit the text information to the service terminal via an INFO message.

14. The user terminal according to claim 13, wherein the instructions, when executed by the processor, cause the processor further to:
   transmit a call request to a network device; and
   receive a call response message returned by the network device after a call supporting text transmission is established between the network device and the service terminal based on session initiation protocol (SIP).

15. The user terminal according to claim 14, wherein the instructions, when executed by the processor, cause the processor further to: receive the display configuration transmitted by the network device, wherein the display configuration is transmitted by the service terminal to the network device, or the display configuration is display configuration corresponding to an identification instruction selected by the network device, based on the identification instruction transmitted by the service terminal, from display configuration stored in the network device.

16. The user terminal according to claim 14, wherein the instructions, when executed by the processor, cause the processor further to: transmit an identification instruction to the network device, and receive the display configuration fed back based on the identification instruction by the network device.

* * * * *